United States Patent
Atarashi et al.

(10) Patent No.: US 6,891,679 B2
(45) Date of Patent: May 10, 2005

(54) OPTICAL SYSTEM AND IMAGE PICKUP APPARATUS

(75) Inventors: Yuichi Atarashi, Hachioji (JP); Nobuyoshi Mori, Hachioji (JP); Shoji Kogo, Hino (JP); Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/843,633

(22) Filed: May 12, 2004

(65) Prior Publication Data

US 2004/0227838 A1 Nov. 18, 2004

(30) Foreign Application Priority Data

May 15, 2003 (JP) ........................................ 2003-137430
Sep. 9, 2003 (JP) ........................................ 2003-316683

(51) Int. Cl.$^7$ ................................................. G02B 1/06
(52) U.S. Cl. ........................................ 359/666; 359/665
(58) Field of Search ................................. 359/665–667

(56) References Cited

U.S. PATENT DOCUMENTS 4,783,155 A * 11/1988 Imataki et al. .............. 359/666
6,702,483 B2 * 3/2004 Tsuboi et al. ............... 396/449
6,806,988 B2 * 10/2004 Onuki et al. ................ 359/253

* cited by examiner

*Primary Examiner*—Evelyn A. Lester
(74) *Attorney, Agent, or Firm*—Finnegan, Henderson, Farabow, Garrett & Dunner, L.L.P.

(57) ABSTRACT

An image pickup apparatus comprises a substrate; an image pickup element to convert a converged light flux to electronic signals; an image-taking optical element positioned so as to converge a light flux from an object onto the image pickup element; a light shielding member to house the image pickup element and the image-taking optical element; a controlling device to control an output of the electronic signals and controlling the image pickup element; and a refracting power-variable optical element.

23 Claims, 21 Drawing Sheets

OPTICAL SYSTEM AND IMAGE PICKUP APPARATUS

BACKGROUND OF THE INVENTION

1. Technical Field

The present invention relates to a small-sized image pickup apparatus and an imaging optical system both used in a cell phone, a personal computer, PDA, a monitoring camera and a sensor camera, and in particular, to a small-sized image pickup apparatus and an imaging optical system employing a solid-state imaging device such as an image sensor of a CCD type or an image sensor of a CMOS type.

2. Related Arts

There has been known a small-sized image pickup apparatus wherein an image pickup element (photoelectron sensing element) such as an image sensor of a CCD (charge-coupled device) type or an image sensor of a CMOS (complementary metal oxide semiconductor) type and a camera lens are integrated solidly, and it is employed in various uses such as a cell phone and PDA (personal digital assistance). The image pickup apparatus of this kind is used extensively for the cell phone especially in recent years, and progress for high pixels of image pickup element used in the image pickup apparatus is remarkable. Further, there are increasing demands for incorporating an autofocusing (focusing) mechanism in the image device.

In the autofocusing mechanism used generally, an actuator such as a stepping motor is housed, the whole of a part of an imaging lens is moved, corresponding to a distance of a subject to be photographed. In the conventional method to drive and move the lens mechanically, there is a possibility that sufficient anti-shock property which is strongly demanded for the image pickup apparatus housed in the cell phone cannot be obtained.

In contrast to this, there has been proposed an optical element wherein optical functions can be switched electrically through utilization of "electrowetting phenomenon" (in different words, "electric capillary phenomenon") without using a driving means such as a motor. For example, the technology like this is disclosed in TOKUHYOO No. 2001-519539 (WO99/18456, U.S. Pat. No. 6,369,954) and TOKUHYOO No. 2002-540464 (WO00/58763). These documents disclose the technology to change refracting power or to hold optical axis center by changing a form of a fluid in particular, concerning an optical element utilizing the "electrowetting phenomenon" stated above.

Incidentally, optical characteristics to converge light on the image pickup element without generating various aberrations are required for the optical element used in a photographing optical system of the image pickup apparatus as stated above. However, optical characteristics required as an optical element of a photographing optical system are not disclosed in the aforementioned documents.

In other words, there is no disclosure at all for the problem in the case of applying this optical element to a photographing optical system, especially to the image pickup apparatus such as the aforesaid one wherein a camera lens is integrated solidly, and for measures for solution for the above-mentioned problem. For the foregoing, the inventors of the present invention found out the following requirements after their studies.

(1) On the refracting power-variable optical element that utilizes the "electrowetting phenomenon", refracting actions can be changed, but it is necessary to consider aberration of a refracting surface formed under the condition of non-voltage impression.

(2) This refracting power-variable optical element has a large individual difference in manufacture, and calibration is needed.

(3) For the optical element used in the photographing optical system, what is most important is a problem of optical axis shifting which needs to be corrected dynamically.

The refracting power-variable optical element that utilizes the "electrowetting phenomenon" cannot construct an appropriate imaging lens by itself, and in many cases, it can realize the imaging lens capable of performing autofocusing only when it is combined with plural optical elements a diaphragm. In that case, there is a problem of the method how to control aberration when it is combined with other optical members. However, there is neither disclosure nor suggestion in the aforementioned documents concerning how to control aberration as a total optical system, when constructing the imaging optical system capable of conducting autofocusing by the use of the refracting power-variable optical element that utilizes the "electrowetting phenomenon".

SUMMARY OF THE INVENTION

The invention has been achieved in view of the problems stated above, and the invention makes it possible to provide an image pickup apparatus capable of conducting appropriate imaging by using an optical element wherein electrowetting phenomenon is utilized. Further, it is possible to provide an image pickup optical system (hereinafter, simply described as optical system) on which the aberration is properly corrected and an image pickup apparatus, while having the refracting power-variable optical element that utilizes the electrowetting phenomenon as an autofocusing means.

The invention is attained by the following items.

First Item of the invention is an image pickup apparatus having therein an image pickup element that is provided on a base board and converts converged light flux into electric signals, a photographing optical element that is arranged to converge a light flux coming from a subject for the image pickup element, a light shielding member that covers the image pickup element and the photographing optical element solidly, a control device that controls output of the electric signals and the image pickup element and the refracting power-variable optical element.

The refracting power-variable optical element mentioned above has therein a first fluid body having a first refractive index and conductivity, a second fluid body that does not have an affinity for the first fluid body and is substantially the same as the first fluid body in terms of density, and has a second refractive index which is different from the first refractive index and has insulating properties, an outer shell member that is made up of nonconductor and has an opening through which the first fluid body and the second fluid body are filled to be sealed and a light flux is made to pass through the first fluid body and the second fluid body, a first electrode that touches the fluid body, an electrode provided on the outer shell member, and a voltage-supplying device that changes a form of filling up in the outer shell member of the second fluid body by changing wettability for the second fluid body of the outer shell member by impressing voltage between the first electrode and the second electrode.

In the First Item, it is possible to secure an optimum focal length and aberration characteristics, and to form an appropriate optical image on a light-receiving surface of the image pickup element, by changing a form of filling up of the second fluid body by the voltage-supplying device.

Second Item of the invention is an optical system that has an optical diaphragm (in different words, aperture stop or optical aperture.) regulating an amount of passing light flux and a refracting power-variable optical element.

The refracting power-variable optical element has therein a first fluid body having a first refractive index and conductivity, a second fluid body that does not have an affinity for the first fluid body and is substantially the same as the first fluid body in terms of density, and has a second refractive index which is different from the first refractive index and has insulating properties, an outer shell member that is made up of nonconductor and has an opening through which the first fluid body and the second fluid body are filled to be sealed and a light flux is made to pass through the first fluid body and the second fluid body, a first electrode that touches the fluid body, an electrode provided on the outer shell member, and a voltage-supplying device that changes a form of an interface between the first fluid body and the second fluid body by impressing voltage between the first electrode and the second electrode. In the aforesaid optical system, when an absolute value of the radius of curvature of the interface between the first fluid body and the second fluid body has a minimum value, the direction toward the center of the radius of curvature from the vertex of the interface and the direction toward the optical diaphragm of the optical system from the vertex of the interface agree with each other.

By using the refracting power-variable optical element stated above, it is possible to realize an autofocusing mechanism without having a movable portion such as an actuator, which is effective for simplification, long life and silent running. However, how to control aberration when constituting an optical system by using the refracting power-variable optical element is a problem.

If the optical diaphragm is arranged in the direction from the vertex of the interface to the center of the radius of curvature when the interface has a minimum radius of curvature, the interface turns out to be of the structure wherein the interface is substantially concentric with the diaphragm. Due to this, an angle of incidence (an angle formed by an incident ray of light and a normal line on the interface) of off-axis ray of light to the interface when an absolute value of refracting power of the interface becomes greatest can be made small, and thereby the aberration of the off-axis ray of light generated on the interface can further be reduced.

DETAILED DESCRIPTION OF THE INVENTION

Figure 1:
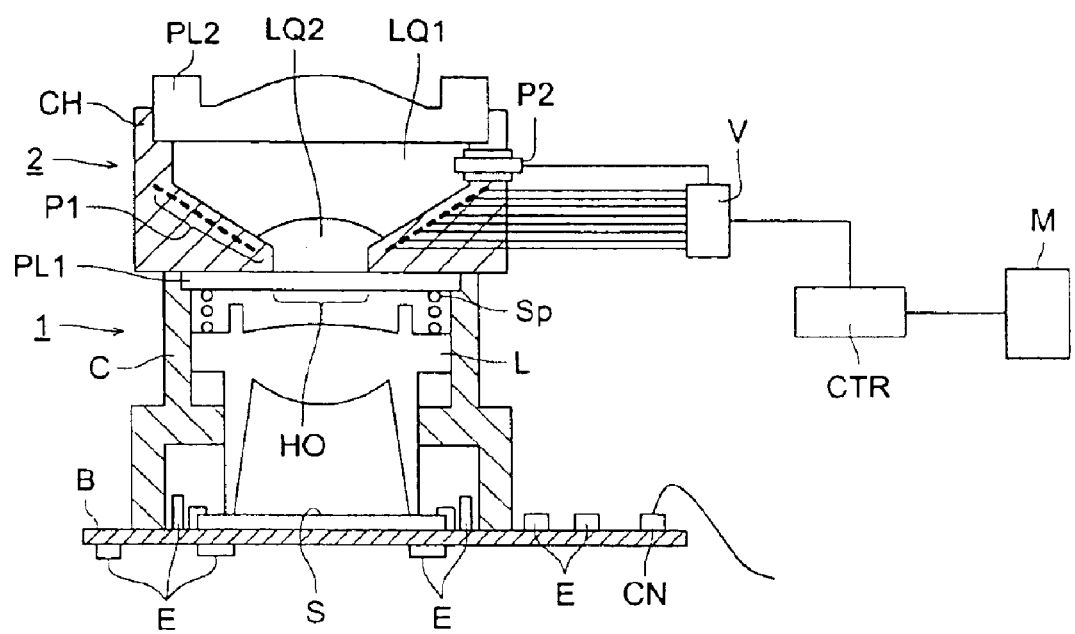
FIG. 1 is a sectional view of an image pickup apparatus relating to the First Embodiment.

In the image pickup apparatus of the invention, it is preferable that the refracting power-variable optical element is further optically transparent, and has a sealing member that has an aspheric optical surface on at least one optical surface, and thereby the opening is sealed by the sealing member. By sealing the opening with the sealing member having an aspheric optical surface that is optically transparent, image forming characteristics for the image pickup element mentioned above can further be improved, in addition to a change of a form of the second fluid body.

Further, it is preferable that the aspheric surface is made to be an optical surface for eliminating aberration that is caused when a light flux passes through the first fluid body and the second fluid body.

In the image pickup apparatus of the invention, one of preferable embodiments is that the refracting power-variable optical element is arranged to be closer to the subject rather than the photographing optical element.

In the image pickup apparatus of the invention, one of preferable embodiments is that the photographing optical element has an optical element closest to the subject, and the optical element is a sealing member closer to the image pickup apparatus for the refracting power-variable optical element.

In the image pickup apparatus of the invention, it is preferable that the refracting power-variable optical element further has IR cut filter that intercepts infrared rays, and the opening is sealed by the IR cut filter.

In the aforementioned embodiment, it is possible to secure an appropriate focal length and aberration characteristics and to form an appropriate optical image on a light-receiving surface of the image pickup element by changing a form of filling up of the second fluid body by means of the voltage-supplying device, and it is further possible to restrict that infrared rays enter and to form an appropriate optical image on a light-receiving surface of the image pickup element by sealing the opening with IR cut filter.

In the image pickup element of the invention, the refracting power-variable optical element further has a storage means that stores relationship between a value of voltage impressed by the voltage-supplying device and a form of filling up of the second fluid body corresponding to the aforesaid value of voltage, and a control means that impresses voltage on the voltage-supplying device based on the relationship stored in the storage means.

In the aforementioned embodiment, it is possible to secure an appropriate focal length and aberration characteristics and to form an image of high image quality on a light-receiving surface of the image pickup element by changing a form of filling up of the second fluid body by means of the voltage-supplying device, and it is possible to conduct photographing that matches a desired scene by using properly, for example, the first voltage for close-up photographing mode and the second voltage for a distant photographing mode, because the control means makes the voltage means to impress voltage based on the relationship stored in the storage means.

In the image pickup apparatus of the invention, it is preferable that the refracting power-variable optical element conducts focal length adjustments.

Further, in the image pickup apparatus of the invention, it is also a preferable embodiment that the refracting power-variable optical element conducts focus adjustments.

In the image pickup apparatus of the invention, an optical axis of the refracting power-variable optical element is adjusted in terms of shifting from an optical axis of the photographing optical element, depending on voltage impressed by the voltage-supplying device.

In the image pickup apparatus of the invention, an optical axis of the refracting power-variable optical element is adjusted in terms of tilting from an optical axis of the photographing optical element, by impressing voltage with the voltage-supplying device.

In the optical system of the invention, it is preferable that a sign of the radius of curvature of at least one surface of a member (outer shell member) that seals a fluid body of the refracting power-variable optical element is the same as a sign of the radius of curvature of the interface, when an absolute value of the radius of curvature of the interface has a minimum value.

By forming at least one surface of the member that seals the fluid body on a curved surface having the same sign as that of the radius of curvature of the interface, when an absolute value of the radius of curvature of the interface has a minimum value, it is possible to reduce aberration caused on the refracting power-variable optical element when an absolute value of the radius of curvature of the interface has a minimum value. If the refracting power of the curved surface of the member sealing the fluid body is the same in terms of a sign as the refracting power in the case where an absolute value of the radius of curvature of the interface has a minimum value, the refracting power of the curved surface of the member sealing the fluid body takes its share for the refracting power of the interface. Thus, it is possible to reduce aberration caused on the entire optical system. On the other hand, if the refracting power of the curved surface of the member sealing the fluid body is different in terms of a sign from the refracting power in the case where an absolute value of the radius of curvature of the interface has a minimum value, aberration caused on the curved surface of the member sealing the fluid body offsets against aberration caused on the interface. Thus, it is possible to reduce aberration caused on the entire optical system.

In the optical system of the invention, it is also preferable that a member that seals a fluid body of the refracting power-variable optical element is made to be a parallel flat plate, and at least one surface of an optical element that is close to or is sticking to the parallel flat plate is formed on the curved surface having the same sign as that of the radius of curvature of the interface in the case where an absolute value of the radius of curvature of the interface has a minimum value. Namely, it is also possible to make a combination of the parallel flat plate and the optical element to exhibit the function identical to that of the member of the curved surface that seals the fluid body having refracting power.

In the optical system of the invention, it is preferable that at least one surface stated above has refracting power that is different in terms of a sign from refracting power in the case where an absolute value of the radius of curvature of the interface has a minimum value.

By making at least one surface mentioned above to have refracting power that is different in terms of sign from refracting power in the case where an absolute value of the radius of curvature of the interface has a minimum value, it is possible to reduce aberration caused on the refracting power-variable optical element in the case where an absolute value of the radius of curvature of the interface has a minimum value. Since aberration caused on the curved surface of the member sealing the fluid body offsets against aberration caused on the interface having the minimum radius of curvature, it is possible to reduce aberration caused on the refracting power-variable optical element.

In the optical system described in the invention, a boundary surface between two members sealing the fluid body and air is formed on a curved surface having the same sign as that of the radius of curvature in the case where an absolute value of the radius of curvature of the interface has a minimum value.

By forming a boundary surface between two members sealing the fluid body and air on a curved surface with a radius of curvature having the same sign as that of the radius of curvature in the case where an absolute value of the radius of curvature of the interface has a minimum value, it is possible to reduce aberration caused on the refracting power-variable optical element in the case where an absolute value of the radius of curvature of the interface has a minimum value. Since the refracting power of the curved surface of the member sealing the fluid body having the same sign as that of the refracting power in the case where an absolute value of the radius of curvature of the interface has a minimum value takes its share for the refracting power of the interface, it is possible to reduce aberration caused on the entire optical system. Further, on the curved surface of another member that seals the fluid body having refracting power having a sign different from that of refracting power in the case where an absolute value of the radius of curvature of the interface has a minimum value, it is possible to reduce aberration caused on the entire optical system, because the aberration caused on the aforementioned curved surface offsets against aberration caused on the interface.

In the optical system of the invention, when refractive indexes of fluid body of the refracting power-variable optical element are represented by ni and no in this order from the closest one to an aperture stop of the optical system, and radiuses of curvature of the interface respectively for focusing on a distant subject and focusing on a subject at a short distance are represented by Rf and Rn, it is preferable that the following expressions are satisfied respectively for ni>no and ni<no.

$$|Rf| > |Rn| \quad (1)$$

$$|Rf| < |Rn| \quad (2)$$

The invention makes it possible to reduce aberration of off-axis ray of light generated on the interface, especially when an absolute value of the radius of curvature of the interface has a minimum value. An angle formed by an off-axis ray of light entering the interface is smaller in focusing on a subject at a short distance than in focusing on a distant subject, when expression (1) is satisfied, and in particular, aberration by off-axis ray of light in focusing on a subject at a short distance can be corrected. On the other hand, when expression (2) is satisfied, the angle is smaller in focusing on a distant subject when an absolute value of refracting power of the interface becomes greatest, than in focusing on a subject at a short distance, and in particular, aberration by off-axis ray of light in focusing on a distant subject can be corrected.

In the optical system of the invention, it is preferable that the photographing lens has the refracting power-variable optical element and a principal lens in this order from the subject side, and the following expression is satisfied when $|f'|$ represents a value in the case where an absolute value of a focal length of the refracting power-variable optical element becomes greatest within a range of subject distance where the optical system can be focused, and f represents a focal length of the principal lens.

$$|f'|/f > 5 \quad (3)$$

By satisfying the expression (3), it is possible to reduce deterioration of optical performance that is caused when each surface of the refracting power-variable optical element is deviated from the optical axis. Incidentally, $|f'|/f > 10$ is more preferable, and $|f'|/f = \infty$ is most preferable. Further, by arranging the refracting power-variable optical element to be closer to the subject side than to the principal lens, it is possible to remove the refracting power-variable optical element from the optical system easily or mount it thereon. In the optical system of the invention, it is preferable that the optical diaphragm is provided between the refracting power-variable optical element and the principal lens.

In the optical system of the invention, when the member sealing a fluid body of the refracting power-variable optical element is made to have a function to block infrared rays, an infrared blocking filter does not need to be provided separately, and a compact optical system can be provided accordingly, which is preferable.

When the image pickup apparatus of the invention has the optical system stated above, an image pickup apparatus capable of imaging high-performance images can be obtained.

EXEMPLIFIED EMBODIMENTS OF THE INVENTION

Referring to the drawings, there will be explained in detail, as follows, the embodiment of the invention to which, however, the invention is not limited.
(First Embodiment)

An example of the invention will be explained as follows, referring to FIG. 1. The numeral 1 represents an image pickup apparatus wherein a photographing optical element and an image pickup element are integrated solidly. Though refracting power-variable optical element 2 (which will be described later) is arranged to be closer to a subject by considering the procedures in manufacturing and time required for adjustment, in this case, it is preferable, from the viewpoint of downsizing and efficiency, to arrange the refracting power-variable optical element 2 at the position of a diaphragm.

The symbol S represents an image pickup element, and it has a function to convert rays of light converged on an imaging surface into electric signals, and CCD or a CMOS sensor can be used as the image pickup element. This is stuck to base board B with thermosetting silver paste, which is of the so-called bare chip mounting.

The symbol L represents a photographing optical element (which is also called an objective lens), and it has a function to converge subject images on an imaging surface (which is also called a light-receiving surface) of the image pickup element S (to converge light that emerges from a subject). In this example, there is employed an aspherical lens made of plastic which is structured in a way that its flange portion is extended in the optical axis direction so that the flange portion may touch the image pickup element S for adjustment of a focus position. The structure of this kind makes focusing in assembling to be unnecessary.

In addition to the photographing optical element L of a single lens type, it is also possible to employ the structure of an optical system wherein a plurality of spherical lenses and aspherical lenses are combined, and it is possible to provide various types of filters and diaphragms between these elements. It is further possible to employ the structure wherein the flange portion is not in contact with the image pickup element.

The symbol C represents a light shielding member and it is an outer shell that is made of plastic resin in which light shielding materials such as carbon black are dispersed. The light shielding member C is glued on the base board by adhesives. The flange portion of the photographing optical element L is of a D-cut shape, and it is engaged with the light shielding member C to prevent rotation on the optical axis. When the flange portion is urged by elastic member Sp that is made of a metal spring, the photographing optical element L is positioned in the optical axis direction.

The symbol E represents an electric component, and it constitutes a control means that contributes to inputting and outputting of imaging signals and control signals and to inputting and outputting of power electric source. These can be provided on the surface and the back side of the base board B, as occasion demands.

The symbol CN represents a connector portion through which the connection to equipment-side CPU such as a personal computer, PDA and a cellphone can be made through the flexible base board, on an electric signal transferable manner.

The numeral 2 represents a refracting power-variable optical element employing the so-called "electrowetting phenomenon". Since this is of a structure that is basically the same as that of what is described minutely in TOKUHYOO No. 2001-519539 (WO99/18456, U.S. Pat. No. 6,369,954), its explanation will be omitted here.

The symbol CH represents an outer shell member, and it is made of insulator. An electrode member shown with P1 is arranged inside the outer shell member CH. In a word, a number of electrode members P1 are arranged in the optical axis direction and in the circumferential direction at certain intervals. This makes the control in a complicated form of fluid body to be possible. On the other hand, P2 represents an electrode that is provided on a sealed filling up portion of the outer shell CH to be protruded therefrom to touch the first fluid body LQ1. Incidentally, electrode P2 is mounted on the outer shell member CH through a member having insulating properties and fluid-sealing properties.

The symbol LQ1 represents a first fluid body which has electrical conductivity and a first refractive index. It is represented by a salt solution in this case. LQ2 represents a second fluid body which has insulating properties and a second refractive index that is greater than the first refractive index. It is represented by oil whose affinity with the first fluid body is extremely low, and therefore, it is not mixed with the first fluid body, and the state of two layers can be maintained. In this case, the second fluid body LQ2 is in a form of a convex lens, and the first fluid body LQ1 is in a form of a concave lens. These two fluid bodies LQ1 and LQ2 are sealed and filled in the outer shell member CH, making it possible for optical images to pass through its opening HO.

The symbol PL1 represents a plastic flat plate constituting a first sealing member that seals the opening HO side (lower side) of the outer shell member CH, and it also functions as a fixing member for urging the elastic member Sp. This sealing plate PL1 may also be made to serve as an IR cut filter or a diaphragm.

The symbol PL2 represents a second sealing member that seals the opposite side of the opening HO (upper side) of the outer shell member CH, and it also is made of plastic, and its surface which is in contact with the first fluid body LQ1 is a flat surface, while, the surface on the opposite side is an optical functional surface representing an aspheric surface.

Though an example wherein image pickup apparatus 1 and refracting power-variable optical element 2 are integrated solidly is disclosed in this case, it is also possible to prepare an image pickup apparatus portion and a refracting power-variable optical element separately and to arrange them to be close each other.

A voltage-supplying device shown schematically as V is connected with electrode P1 and electrode P2, and it impresses voltage as occasion demands to generate an electric field. Owing to this, "electrowetting phenomenon" is generated, and a form of the second fluid body LQ2 and refracting actions are changed.

Since the voltage-supplying device V impresses voltage that is relatively high, a boosting circuit is needed. Therefore, in this case, it is possible to employ the structure wherein an unillustrated electronic flash emitting device is combined and a boosting circuit provided in the electronic flash emitting device is used to impress high voltage.

Incidentally, in the present example, a number of electrode members P1 are arranged, various electric fields are generated in case of need, and thereby, the electrowetting phenomenon can be controlled in many ways. However, it is naturally possible to change the position of arrangement of electrodes and to limit the number of electrodes depending on the purpose, without following this example. Further, although the wetting actions are changed by forming electric fields in the present example, it is also possible to use a bubble jet method representing one ink jet method, for example, wherein heat is generated to form bubbles, and thereby, a volume is changed and a form of the second fluid body LQ2 is changed to vary the refractive index.

Now, as stated above, a refracting interface formed by fluid bodies LQ1 and LQ2 is not free from aberration individually, but it is in the state where various aberrations are inherent. In the present embodiment, therefore, this problem is solved by making PL2 representing the second sealing member to be an aspherical plastic lens.

Therefore, even under the condition that no voltage is impressed, it is possible to use as an optical element without aberration, and by devising a form of the aspheric surface further, it is also possible to create an optical surface that corrects aberration caused by a refracting interface of a fluid body, independently of whether voltage is impressed or voltage is not impressed.

Figure 2:
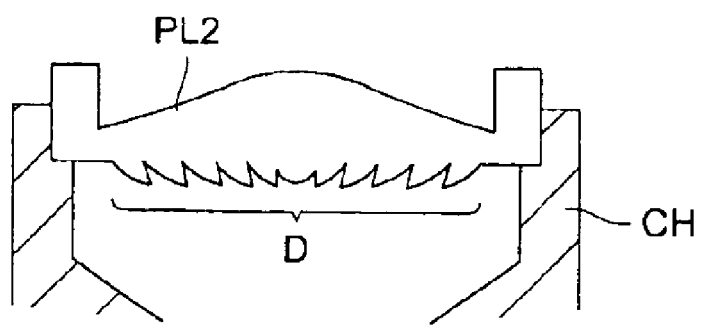
FIG. 2 is a partial sectional view relating to a variation of the image pickup apparatus.

It is further possible to provide a diffractive structure on the first sealing member PL1 and/or the second sealing member PL2. FIG. 2 shows an example wherein diffractive structure D is provided on the lower surface of the second sealing member PL2.

Incidentally, a form of opening HO of outer shell member CH does not need to be in a real circle. When conducting correction for non-axis object, such as that an object to be corrected is AS (astigmatism) as will be described later, it is preferable to form an opening suitable for the correction. In such a case, the opening can be made to be in an oval form or a rectangular form.

In particular, since image pickup element S is usually in a rectangular form, an opening form that is fitted to the aforesaid form is preferable from the viewpoint of light convergence efficiency.

Storage means M shown schematically stores LUT showing corresponding relationship between a value of voltage to be impressed on voltage-supplying device V and refracting actions of a refracting interface that is formed by fluid body LQ2 based on the aforesaid value of voltage. This is composed of ROM portion on which a value obtained by conducting design and experiments in advance is recorded and of RAM portion on which a correction value is stored by conducting calibration for solving each individual difference.

Control means CTR shown schematically in the same way reads a voltage value, based on instructions from unillustrated CPU on the main body side (not shown), from storage means M based on refracting actions, to form a desired refracting interface, and gives instructions to voltage-supplying device V.

Further, the storage means M may also store LUT for conducting correction by changing refracting actions for the detected temperature, for another purpose of correcting temperature changes.

An example of the control employing refracting power-variable optical element 2 wherein the electrowetting phenomenon is utilized will be explained as follows.

(1) Example of Conducting Focal Length Adjustment

A combination of photographing optical element L and refracting power-variable optical element 2 makes a focal length under the state where no voltage is impressed to be different from that under the state where voltage is impressed. In this case, the state of pan-focus is generated undesirably because precise focusing actions cannot be provided, but, a degree of freedom for photographing is increased because a focal length can be changed.

(2) Example of Focusing

Voltage is impressed to change refracting actions and thereby to conduct focusing. Due to this, photographing in focus can be conducted for objects at various object distances. Further, even if position adjustment and performance of photographing optical element L are not sufficient, in particular, sufficient focusing performance can be obtained by using refracting power-variable optical element 2.

(3) Close-Up Photography

When close-up photographing needs to be conducted, all groups of the photographing lens are slightly advanced usually, or a part of the photographing lens is slightly advanced. In this case, however, refracting actions are slightly changed to cope with the photographing, without using the advancing mechanism of that kind. With respect to the state of refracting, it is preferable that the normal photographing is under the state of non-impression of voltage and close-up photographing is under the state of impression of voltage.

(4) Conducting Aberration Correction

The refracting interface is made to be an aspheric surface by devising voltage impression. Owing to this, various aberrations such as field distortion and coma in addition to chromatic aberration are corrected. It is also possible to provide a temperature sensor so that changes in refractive index are generated by temperature differences and thereby spherical aberration caused by the changes in refractive index is corrected.

(5) Conducting Shift Adjustment

For obtaining images at high image quality, one of characteristics required in the photographing optical system is that an optical axis of each optical element is aligned with others. Under that condition, when an optical axis of the photographing optical element L is deviated from that of refracting power-variable optical element 2, an optical axis of a fluid body is shifted by devising an extent of voltage impression so that the photographing optical element may agree with the optical axis as a result. In the same way of thinking, eccentricity can also be corrected.

(6) Conducting Tilt Adjustment

In the same way as in the foregoing, it is also necessary to correct when optical axes are tilted each other. There is further an occasion to photograph by tilting an optical axis intentionally. In that case, adjustment is made by tilting an optical axis of a fluid body by devising an extent of voltage impression, so that a desired axis angle may be obtained.

(7) Conducting Correction of Camera-Shake

When photographing while holding a photographing equipment including an image pickup apparatus with a hand, a camera-shake problem is caused. To overcome this problem, a vibration sensor is incorporated, and the aforementioned shift adjustment and tilt adjustment is conducted based on information obtained from the vibration sensor to correct the camera-shake. In this case, it is preferable to prevent a phenomenon of noise increase by decreasing the shutter speed.

(8) Conducting Astigmatism Correction

When a ray of light has aberrations both in the direction (X direction) perpendicular to optical axis (Z axis) and the direction (Y direction) perpendicular to the X direction, curvature in the X direction is made to be different from that in the Y direction by devising voltage impression for correcting the aforesaid aberrations, and thereby the astigmatism is corrected. As stated above, it is preferable not to make a form of opening HO to be in a real circle in this case.

(9) Using Protective-Cover-Integrated Image Pickup Element

Figure 3:
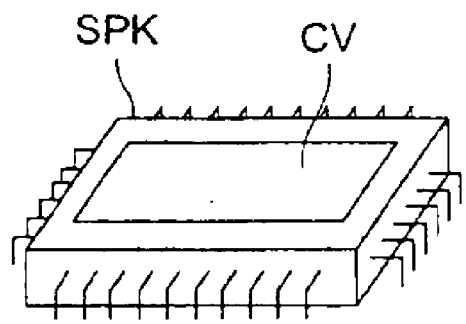
FIG. 3(a) is a perspective view of a protective-cover-integrated image pickup apparatus, and each of FIGS. 3(b) and 3(c) is a sectional view thereof.
Figure 3:
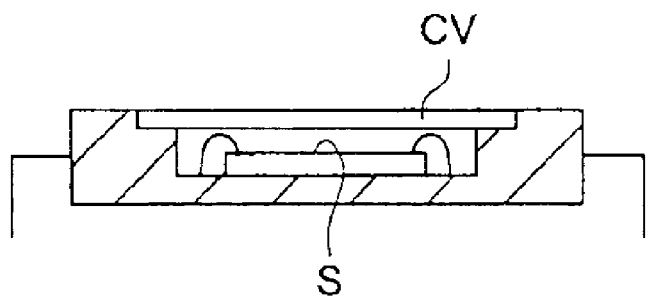
Figure 3:
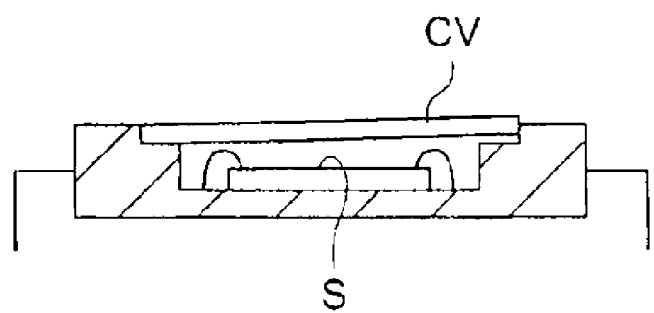

The present example will be explained, referring to FIG. 3. Image pickup element SPK shown in FIG. 3(a) is not a bare chip like that mentioned above, but it is a packaged element having protective cover CV and it is used commonly for a VTR camera and a digital still camera. FIG. 3(b) is a sectional view.

The image pickup element SPK of this kind is provided with protective cover CV that is made of glass or plastic, and this protective cover CV is arranged to be inclined slightly from an image plane by mounting errors in the course of manufacturing, as shown in FIG. 3(c), in many cases.

However, if this state is allowed to stand, it is not possible to eliminate errors caused by the inclination of the protective cover, even when other optical elements are arranged accurately, thus, the so-called "single-sided blur" is generated.

In contrast to this, in the present embodiment, it is possible to solve the problem of poor efficiency caused by errors in mounting of the protective cover, by conducting shift adjustment identical to the foregoing based on signals outputted from the image pickup element SPK. Further, not only shift adjustment but also tilt adjustment may be conducted simultaneously.

(10) Forming Diffractive Surface

Figure 4:
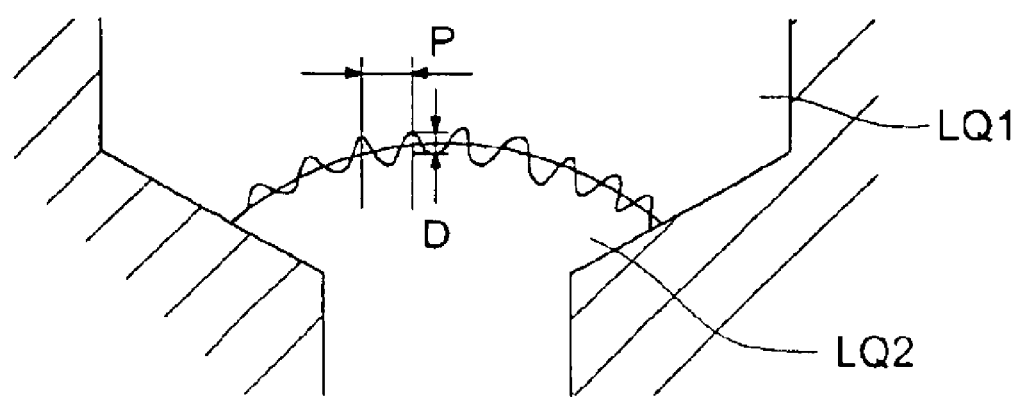
FIG. 4 is a partial sectional view relating to a variation of the image pickup apparatus.

With respect to the present example, a schematic diagram is shown in FIG. 4. By impressing high frequency voltage from voltage-supplying device V, there is formed a surface that is undulated substantially in a form of a sine curve, and dummy diffractive surface is formed. By controlling the voltage to be impressed and a frequency, it is possible to control depth D and pitch P of the diffractive surface. It is further possible to control freely a combination of an aspheric surface and a diffractive surface, by frequency weight. Due to this, chromatic aberration and spherical aberration can be corrected unrestrictedly.

Next, a fluid body will be explained. It is desired that Abbe's number of the fluid body to be filled is relatively small, because it is preferable that dispersion of the filled fluid body is small as an optical element material. Further, with respect to the fluid body, those in the conventional technology can be employed, and for that purpose, it is also possible to devise as follows.

(1) The refractive index is adjusted by dispersing fine powder in the fluid body. For example, even when water or oil is used as a fluid body, the refractive index is not sometimes matched because of the relation with a function to be corrected. In that case, the refractive index is adjusted by dispersing fine powder to the extent where the transmittance is not lowered.

(2) The fluid body is colored so that it may become ND filter in which the density is variable. In this case, what is colored may either be the first fluid body or the second fluid body, or both of them.

(3) By coloring the first fluid body which will take a form of a concave lens, brightness of edge of image field is lowered intentionally to make the first fluid body to have the function which is the same as that of apodization filter.

(4) Those having the IR cut function are used as a fluid body. Owing to this, it is not necessary to incorporate those having IR cut functions as a sealing plate and other optical elements, which contributes to downsizing.

(5) By using liquid crystal components in a fluid body, not only a form but also the state of polarization are changed by voltage impression to conduct polarization correction.

(Second Embodiment)

The present embodiment will be explained as follows, referring to FIG. 5. This is the one wherein a plurality of refracting power-variable optical elements 2 are provided continuously in the optical axis direction. Explanation of the portions of the present embodiment which are the same as those in the First Embodiment will be omitted here.

Figure 5:
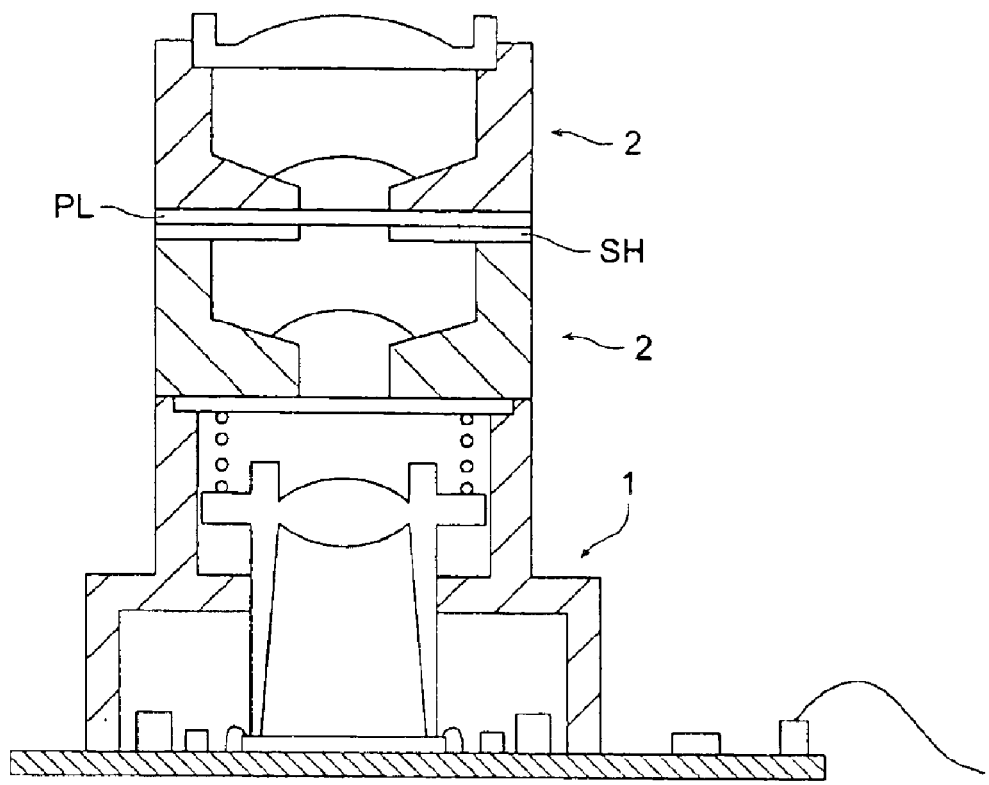
FIG. 5 is a sectional view of an image pickup apparatus relating to the Second Embodiment.
Figure 6:
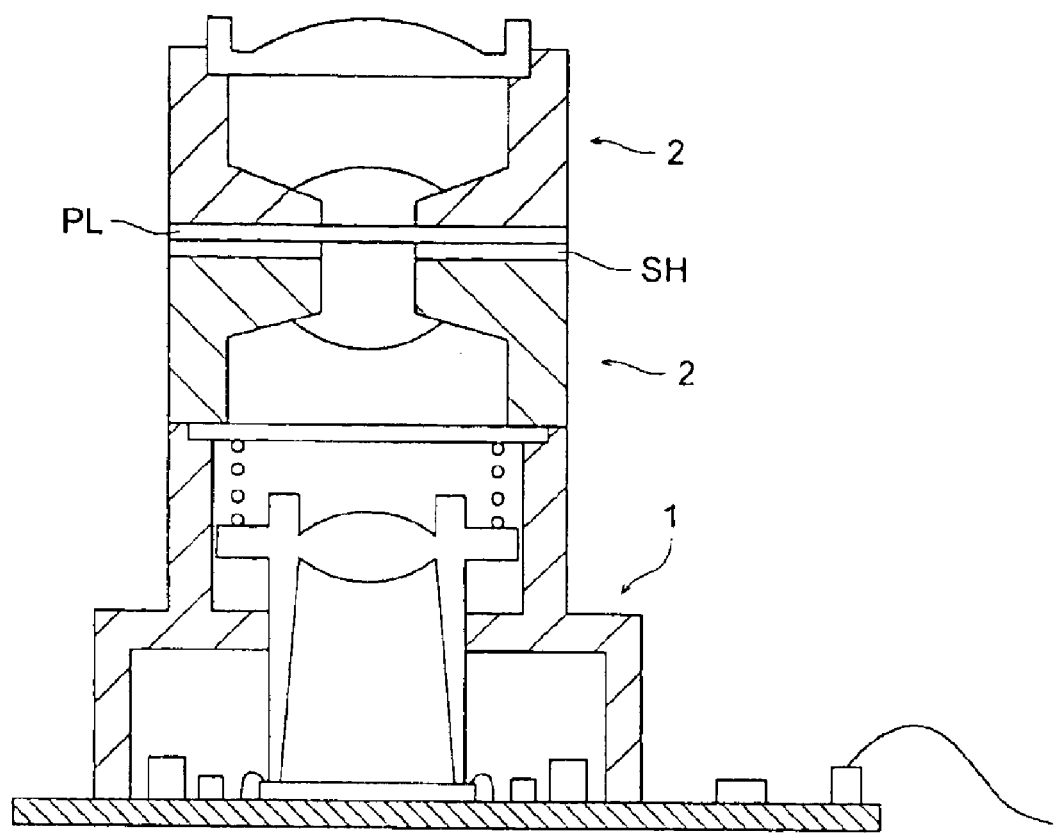
FIG. 6 is a sectional view relating to a variation of the image pickup apparatus.

The structure in FIG. 5 is the same, in principle, as one wherein refracting lenses are arranged to be movable respectively in the optical axis direction, for two groups, and an optical system which is functionally the same as a zoom lens system can be realized. It is also possible to employ an arrangement wherein refracting power-variable optical elements 2 are combined to be in opposite directions each other as shown in FIG. 6.

A combination of three or more refracting power-variable optical elements 2 is naturally possible too, and in this case, more substantial optical functions can be realized. Further, the correction function stated in the First Embodiment can also be applied simultaneously.

Further, in this example, sealing member PL is used for two purposes for shortening a length in the optical axis direction. Owing to this, positioning in the course of manufacturing is easy and tilting of an optical axis is hardly caused, which is an advantage.

When two outer shell members are positioned to be close each other under the condition that voltage is impressed and an electric field is generated, thus, electrowetting phenomenon is caused, there is a fear that an interference is caused. Therefore, it is preferable to devise an arrangement of electrodes, or to arrange the member SH that blocks an electric field between refracting power-variable optical elements 2. This member SH can also be used as a diaphragm.

(Third Embodiment)

Figure 7:
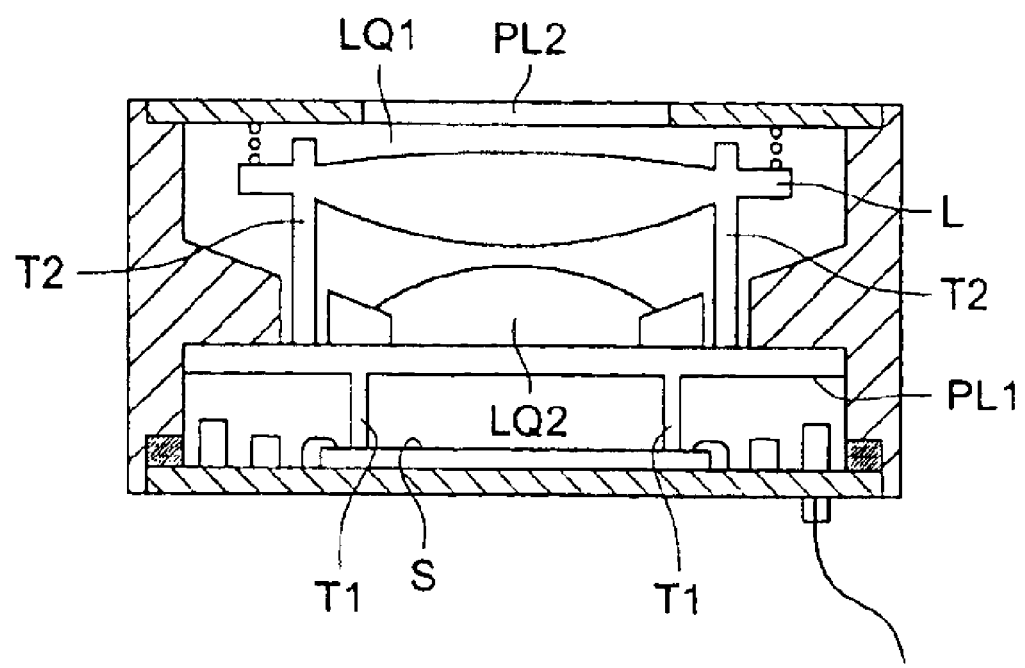
FIG. 7 is a sectional view of an image pickup apparatus relating to the Third Embodiment.

The present embodiment will be explained as follows, referring to FIG. 7. This is the one wherein further downsizing in the optical axis direction is aimed from the First Embodiment, and a photographing optical element is embedded in the fluid body. Explanation of the portions of the present embodiment which are the same as those in the First Embodiment will be omitted here.

In this case, there is provided member T1 protruded downward from sealing member PL1 for positioning in the optical axis direction so that the member T1 may come in contact with the upper surface of image pickup element S. To prevent that fluid bodies disturb interfaces each other, an arrangement is made so that member T2 protruded downward from a flange of imaging optical element L may come in contact with sealing member PL1 without touching fluid body LQ2. Because of this structure, it is possible to realize an image pickup apparatus which is small-sized in the optical axis direction.

(Fourth Embodiment)

The fourth example will be explained as follows, referring to FIG. 8. Though each example stated above is an example wherein an optical element is arranged in the optical path of a photographing optical system, there is provided a microscopic optical element that is varied by electrowetting phenomenon, for each pixel or some pixels of an image pickup element, in the present example.

Figure 8:
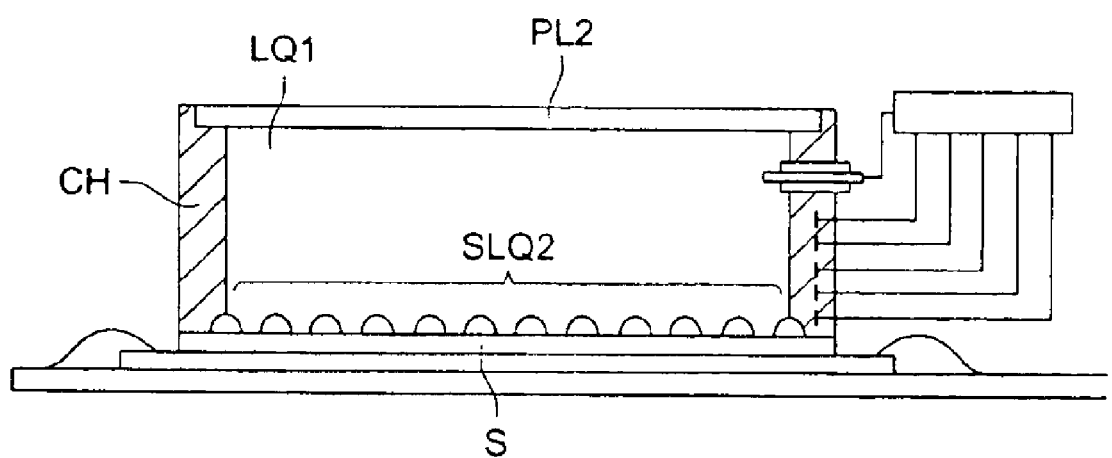
FIG. 8 is a sectional view of an image pickup apparatus relating to the Fourth Embodiment.

The symbol SLQ 2 in FIG. 8 is a second fluid body arranged right above an area corresponding to one pixel of image pickup element S. Incidentally, FIG. 8 is a schematic diagram which does not show an actual structure wherein an image pickup element is composed of pixels in quantity from tens of thousands to several millions, and SLQs 2 greater than those shown in the schematic diagram in terms of quantity are arranged. In the course of manufacturing, it is possible to form microscopic liquid-drops by employing ink-jet technologies, and thereby, by jetting microscopic liquid-drops of the second fluid bodies SLQ 2. In this case, although liquid-drops of the second fluid body SLQ 2 may be arranged right above image pickup element S, it is preferable to provide a transparent coating and thereby to perform the processing that prevents that the second fluid body SLQ 2 is wetted to be spread on this transparent coating more than necessary. This can also be realized by making a transparent and thin glass base board or a plastic base board to stick to the image pickup element, without coating.

After liquid-drops of the second fluid body SLQ 2 are arranged on the image pickup element S as stated above, the first fluid body LQ 1 is filled in outer shell member CH and is sealed by transparent member PL 2.

When using an optical element employing the electrowetting phenomenon as stated above, it is preferable that many electrodes are provided on the outer shell member CH. Specifically, combinations of electric fields to be generated can be made rich in a number by providing many electrodes in both the optical axis direction and the circumferential direction and by controlling the state of electrization, and thereby, a form of a liquid-drop of each second fluid body SQL 2 can be controlled.

Namely, by using the second fluid body SQL 2, a form of a microlens corresponding to each pixel of image pickup element S can be controlled, and thereby, exposure control and shading correction are made to be possible.

(Fifth Embodiment)

Figure 9:
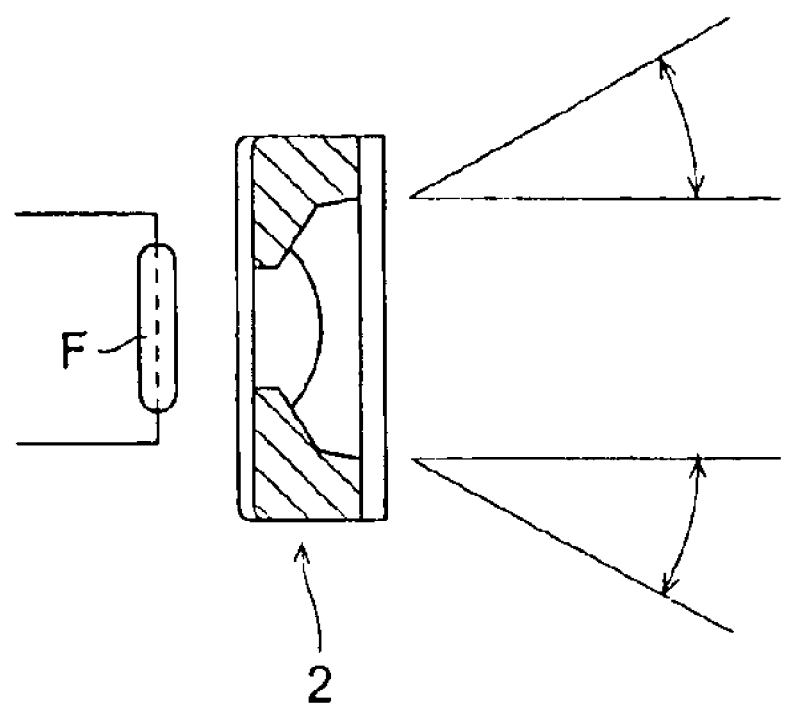
FIG. 9 is a sectional view of an electronic flash device relating to the Fifth Embodiment.

This is an example applied not to a photographing optical system but to an electronic flash device. This will be explained as follows, referring to FIG. 9. Since this is an optical element capable of changing refracting actions as explained above, it is possible to make an angle in the case of floodlighting to be variable by arranging the refracting power-variable optical element 2 between light-emitting member F such as a xenon tube or a white LED and a subject (subject to be floodlighted).

For example, it is possible to conduct appropriate floodlighting corresponding to circumstances by changing light distribution between an occasion to photograph a subject at a distance that is relatively short and an occasion to photograph a distant subject. It is further possible to obtain divergent light by changing a fluid body into a form of Fresnel screen by making diffractive surface as described above, wherein there is an advantage that a shade is hard to be generated on the subject.

(Sixth Embodiment)

Figure 10:
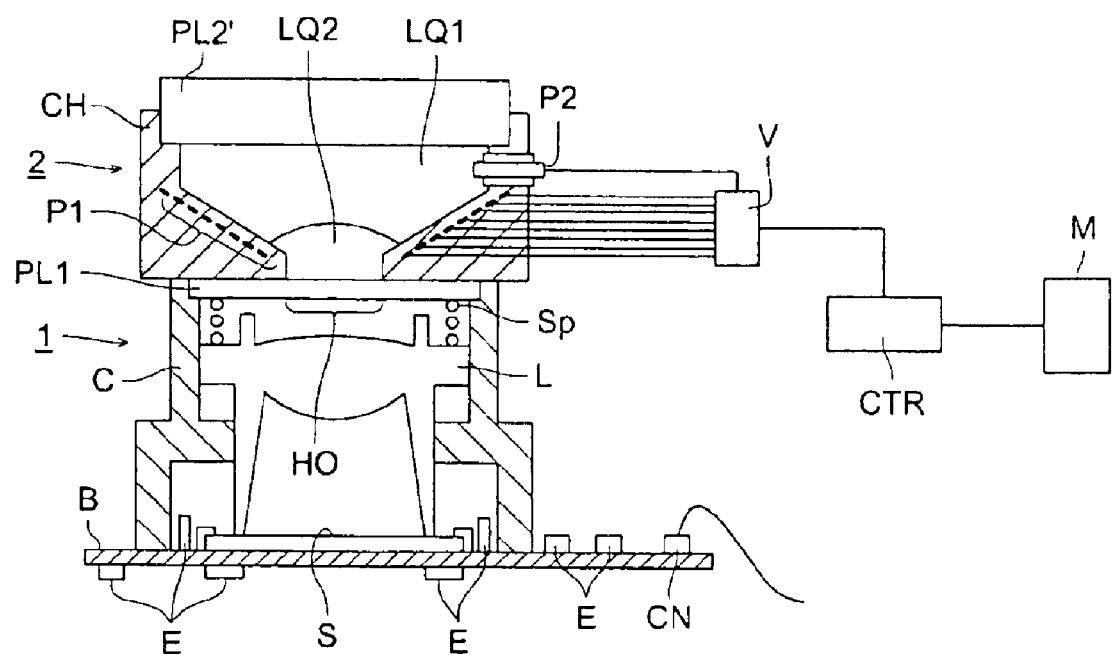
FIG. 10 is a sectional view of an image pickup apparatus relating to the Seventh Embodiment.

The present embodiment will be explained as follows, referring to FIG. 10. In the present embodiment, there are provided two optical members for the image pickup element S, so that a light flux coming from a subject may be converged by these optical members. Though in the First Embodiment shown in FIG. 1, aberration owned by refracting power-variable optical element 2 is corrected by making PL 2 representing sealing member 2 to be an aspheric surface, PL 2' is a flat plate having light transmission in the present embodiment.

Depending on adjustment or performance of the refracting power-variable optical element 2, there is sometimes an occasion where aberration owned by the refracting power-variable optical element 2 is not a problem. In such a case, flat plate PL 2 does not need to be an aspheric surface. Further, it is also possible to make objective optical element L to have a function to correct aberration of the refracting power-variable optical element 2, for downsizing. In this case, it is preferable that the objective optical element is composed of a plurality of elements.

(Seventh Embodiment)

In the aforesaid embodiment, there has been explained a technology wherein calibration is conducted for eliminating an individual difference, and an extent of changes in refracting actions is measured and refracting actions under the state of non-impression of voltage are measured to establish a standard, and in the technology, it is preferable to reduce time required for such measurement and establishment of the standard.

When manufacturing refracting power-variable optical element 2 employing "electrowetting phenomenon" relating to the invention, it is possible to use an ink jet technology without being limited to the aforementioned embodiments. Since the ink jet technology makes it possible to jet a microscopic amount of liquid-drops, a liquid amount of the second fluid body can be controlled highly accurately. It is further possible to use a dispenser as a highly accurate liquid supply technology.

Furthermore, it is preferable to process the surface of said part in order to regulate and smooth of a wet spread of the second fluid body. Silicon system resin or an organic compound can be used for surface coat, but a surface reforming method by atmospheric pressure bottom plasma developed and proposed in recent years can be adopted.

After having arranged the second fluid body to an opening, it is preferable that deaeration and a de-bubble are conducted against the first fluid body before the first fluid body is filled up. For deaeration and a de-bubble, after having put the first fluid body in a predetermined container, an unnecessary gas component effectively can be removed by adding supersonic wave vibration. Under this circumstance, deaeration and a de-bubble can be conducted effectively by superposing and adding a supersonic wave with different frequency.

When the first fluid body is filled up, the following method can be used. After, the fluid body with smaller density is filled and finely justified its position, the first fluid body is poured. Under this circumstance, because density of the first fluid body is larger, it pushes aside the fluid body which is poured ahead naturally, and it takes place of the second fluid body.

Figure 11:
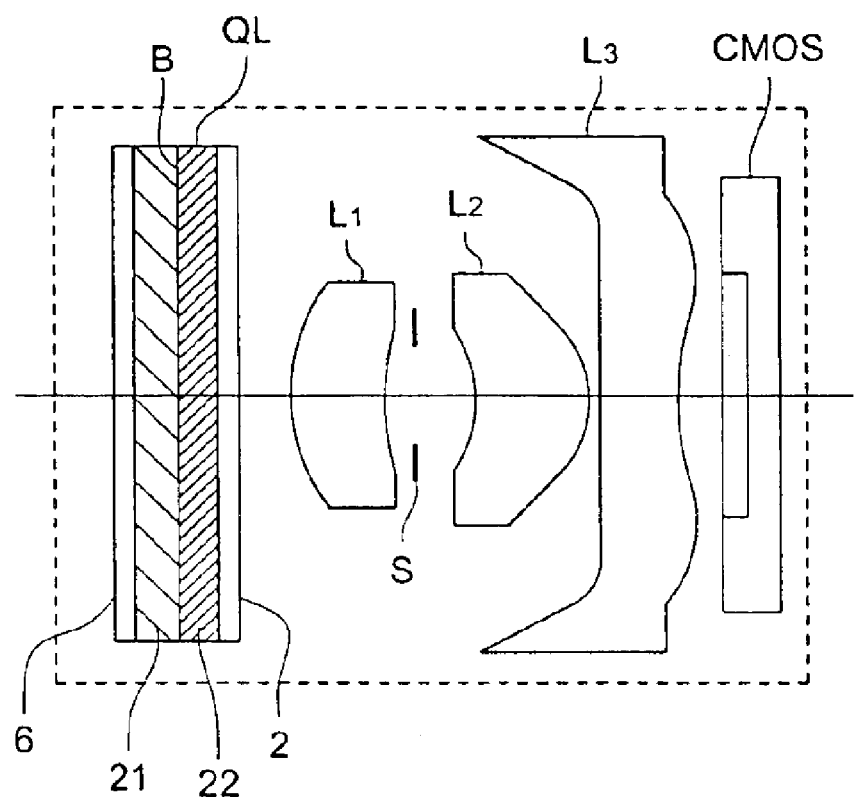
FIG. 11 is a schematic structure diagram of an image pickup apparatus relating to the present embodiment.

FIG. 11 is a sectional view taken in the optical axis direction of an image pickup apparatus including a camera lens relating to the embodiment of the invention, in which a driving section for refracting power-variable optical element QL and other electric circuits are omitted. In FIG. 11, the optical system includes therein the refracting power-variable optical element QL, principal lens L1, aperture stop S, principal lens L2 and principal lens L3 in this order from the object side, and the image pickup apparatus is composed of this camera lens and image sensor CMOS. Incidentally, in FIG. 11, the refracting power-variable optical element QL is shown in its simplified form.

Figure 12:
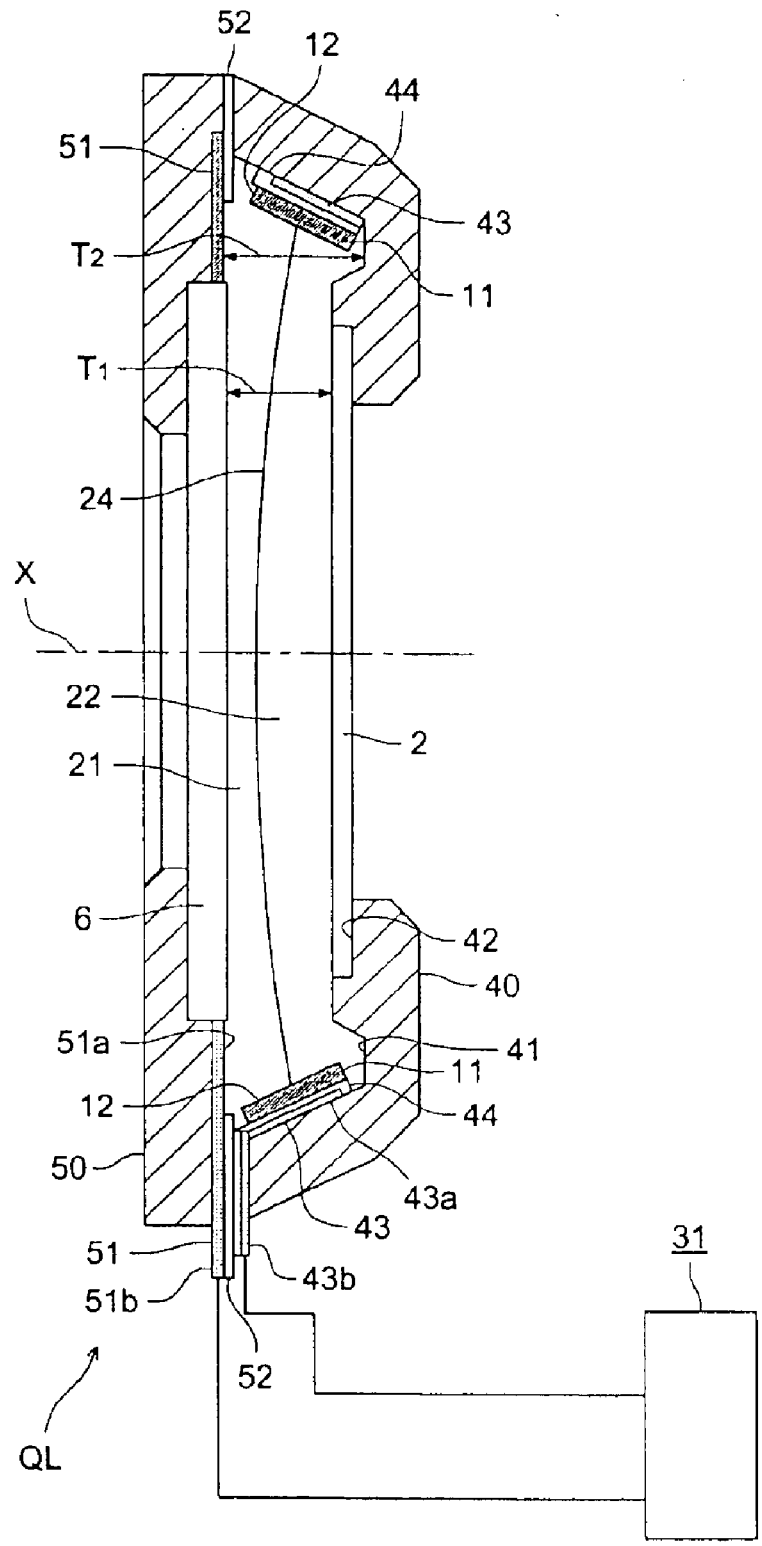
FIG. 12 is a schematic structure diagram of refracting power-variable optical element QL and its driving portion.

FIG. 12 is a schematic structure diagram of the refracting power-variable optical element QL and a driving section therefore. The symbol QL represents a refracting power-variable optical element relating to the present embodiment. The numeral 40 represents a lower shell formed by a nonconductor. In the peripheral portion on the bottom surface (right inner side in the diagram) of the lower shell 40, there is formed first recessed portion 41, and on the inner diameter side (closer to the center), there is formed second recessed portion 42 that holds first sealing plate 2. The first sealing plate (member to seal a liquid) 2 is made of transparent acrylic or glass.

On the total circumference on the inner side of the peripheral wall portion of the lower shell 40, there is provided second electrode ring 43, and on the surface of this second electrode ring 43, insulating layer 44 which is made of acrylic resin or the like and covers also electrode edge face 43a is formed to stick to the aforementioned surface.

In this case, the peripheral wall portion of the lower shell 40 is inclined in a way that the right edge side is closer to optical axis X than the left edge side is in the diagram. Due to this, first electrode ring 43 and the insulating layer 44 are inclined from the optical axis X.

A thickness of the insulating layer 44 increases gradually toward the right side in the diagram. Further, on the lower side on the total circumference on the inner side of the insulating layer 44, there is coated water-repellent processing agent and water-repellent layer 11 is formed. In addition, on the left side on the total circumference on the inner side of the insulating layer 44, there is coated hydrophilic processing agent and hydrophilic layer 12 is formed.

The numeral 50 represents an upper shell formed by a nonconductor, and it holds second sealing plate (member to seal a fluid body) 6 that is made of transparent acrylic or glass, in its inside diameter. Further, on the right edge face on the peripheral portion of the upper shell 50, first electrode ring 51 in a sheet form is formed to stick to the aforementioned edge face.

On the surface of the first electrode ring 51, there is formed insulating layer 52 to stick to the surface, and the insulating layer 52 is formed to cover only an outer edge side of the first electrode ring 51 so that exposed portion 51a which touches first liquid 21 explained later to impress voltage thereon may be provided.

By sealing the peripheral wall portion of the lower shell 40 and the upper shell 50 on a liquid-tight basis, there is formed a container serving as a casing having a liquid chamber with a prescribed volume surrounded by the lower shell 40, the upper shell 50, the first sealing plate 2 and the second sealing plate 6.

This container is in a shape of axial symmetry about optical axis X. Two types of liquids are filled in the liquid chamber in the following way.

First, under the condition that optical axis X of the lower shell 40 provided with the first sealing plate 2 is in the vertical direction, second fluid body 22 is dropped on a top surface of the first sealing plate 2 representing a bottom surface of the liquid chamber and on a bottom surface on the peripheral side of the lower shell 40 (these corresponding to interface-facing surface) by an amount which makes a height of its liquid column to be at a middle point of a height of water-repellent film 11 on the peripheral wall portion.

Colorless and transparent silicone oil having specific gravity of 1.06 and room refractive index of 1.45 is used as the second fluid body 22. Then, first fluid body 21 is filled in the remaining space of the liquid chamber. The first fluid body 21 is an electrolytic solution (fluid body having conductivity or polarity) wherein water and ethyl alcohol are mixed at a prescribed rate, and a prescribed amount of salt is further added so that specific gravity is 1.06 and room refractive index is 1.35.

Namely, for the first and second fluid bodies 21 and 22, there are selected fluid bodies which are the same in terms of specific gravity, and are different in terms of refractive index and are insoluble each other. Both fluid bodies 21 and 22 form interface 24 and are not mixed each other to be in existence independently.

A form of the interface 24 is determined by a balance of three boundary tensions which are exerted on the point where an inner surface of the liquid chamber (container), the first fluid body 21 and the second fluid body 22 intersect, namely, on an outer edge portion of the interface 24. After that, the upper shell 50 on which the second sealing plate 6 is mounted is attached on the lower shell 40, thus, two types of fluid bodies are sealed.

The numeral 31 represents a power supply circuit connected to first electrode ring 25 and to second electrode ring 3.

Two amplifiers (not shown) of the power supply circuit 31 are connected respectively with terminal portion 51b and 43b which are drawn out respectively from the first electrode ring 51 and the second electrode ring 43 in the direction perpendicular to the optical axis along the right end side of the upper shell 50.

When voltage is impressed on the first fluid body 21 through the first electrode ring 51 and the second electrode ring 43 in the structure stated above, the interface 24 is deformed by the so-called electro-wetting effect.

Next, deformation of the interface 24 in the refracting power-variable optical element QL and optical actions caused by the deformation will be explained.

First, when voltage is not impressed on the first fluid body 21, a form of the interface 24 is determined by boundary tension between both fluid bodies 21 and 22, boundary tension between the first fluid body 21 and water-repellent film 11 or hydrophilic film 12 on insulating layer 44, boundary tension between the second fluid body 22 and water-repellent film 11 or hydrophilic film 12 on insulating layer 44 and a volume of the second fluid body 22.

On the other hand, when voltage is impressed on the first fluid body 21 by power supply circuit 31, boundary tension between the first fluid body 21 and hydrophilic film 12 is reduced by electro-wetting effect, and the first fluid body 21 rides across the boundary between hydrophilic film 12 and water-repellent film 11 to enter the water-repellent film 11, resulting in an increase of a height of the second fluid body 22 on the optical axis.

As stated above, voltage impression on the first fluid body 21 through the first and second electrode rings 51 and 43 changes a balance of boundary tension between two types of fluid bodies, and thereby, a form of the interface 24 between both fluid bodies 21 and 22 is changed In this way, it is possible to realize an optical element wherein a form of interface 24 can be changed freely by the control of voltage of the power supply circuit 31.

Further, since each of the first and second fluid bodies 21 and 22 has different refractive index, optical power (1/f: f represents a focal length) as an optical lens is given, and a focal length of the refracting power-variable optical element QL is changed by a change in a form of the interface 24.

When autofocusing is performed on the apparatus shown in FIG. 12, power supply circuit 31 obtains a distance from an unillustrated focusing sensor to a subject and obtains voltage to be impressed corresponding to the established subject distance from the table storing in advance voltage to be impressed on the refracting power-variable optical element QL at each magnification, to impress on the refracting power-variable optical element QL. By controlling in this manner, the refracting power-variable optical element QL can change optical power as desired. Incidentally, changes of optical power on a multi-step basis is preferable, and that on a continuous basis is more preferable.

By passing through a variable focal length optical system whose focal length is adjusted in the aforesaid manner, an optical image formed on the imaging surface is converted into an electric signal by image sensor CMOS, and is further subjected to prescribed processing to be converted into an image signal.

EXAMPLES

An example of an optical system suitable for the aforementioned image pickup apparatus will be shown below. Symbols used in each example are as follows. Incidentally, in the present specification (including data in Table), an exponent of 10 (for example, $2.5 \times 10^{-3}$) is expressed by using E (for example, 2.5×E−3).

$f_{total}$: Focal length of total optical system f': Focal length of refracting power-variable optical element f: Focal length of principal lens fB: Back focus F: F number T: Subject distance 2Y: Length of diagonal of imaging surface of CCD R: Radius of curvature D: Distance between axial surfaces Nd: Refractive index of lens material for d line vd: Abbe's number of lens material In each Example, a form of an aspheric surface is expressed by the following "Numeral 1" when a vertex of a surface is made to be the origin, X-axis is made to be in the optical axis direction, and height in the direction perpendicular to the optical axis is represented by h.

$$X = \frac{h^2/R}{1 + \sqrt{1-(1+k)h^2/R^2}} + \sum A_i h^i \qquad \text{(Numeral 1)}$$

In the expression above, Ai represents $i^{th}$ aspheric surface coefficient, R represents a radius of curvature and K represents a conic constant.

Incidentally, when an interface radius of curvature of the refracting power-variable optical element is changed, a center thickness of each fluid body remains unchanged concerning the following data of Examples. However, this is an approximation for showing an effect of the invention, and in the actual situation, the center thickness of each fluid body is changed so that a volume of each fluid body may remain unchanged when the interface radius of curvature is changed.

Example 1

Figure 13:
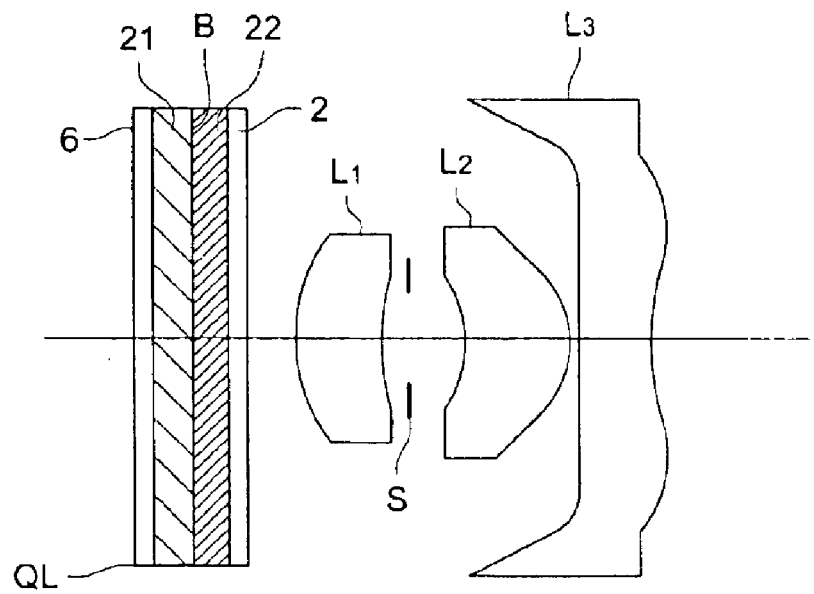
FIG. 13(a) and FIG. 13(b) are sectional views of an imaging lens of Example 1.
Figure 13:
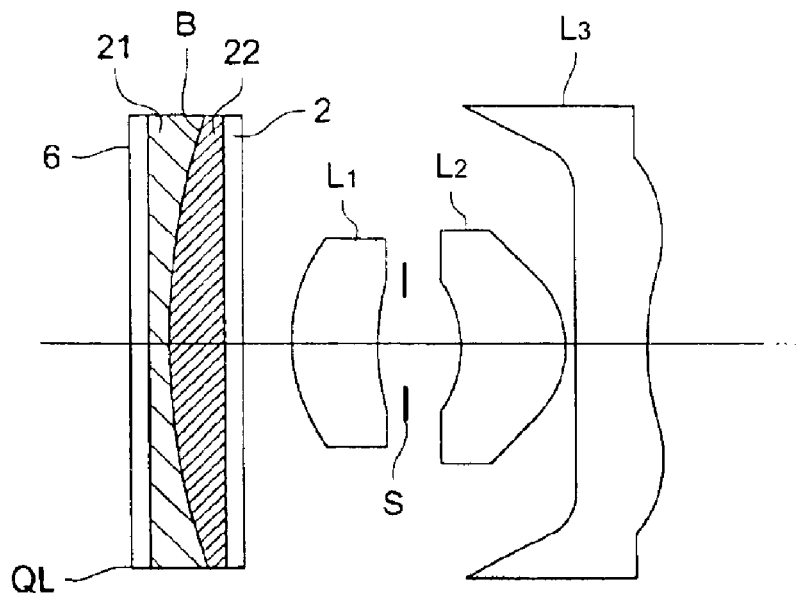
Figure 14:
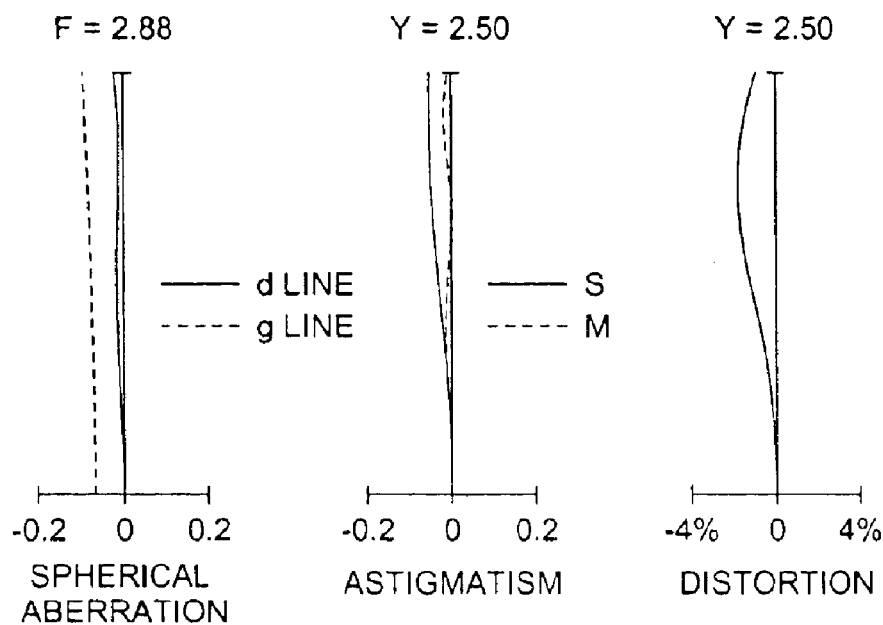
FIG. 14(a) and FIG. 14(b) are aberration diagrams of an imaging lens of Example 1.
Figure 14:
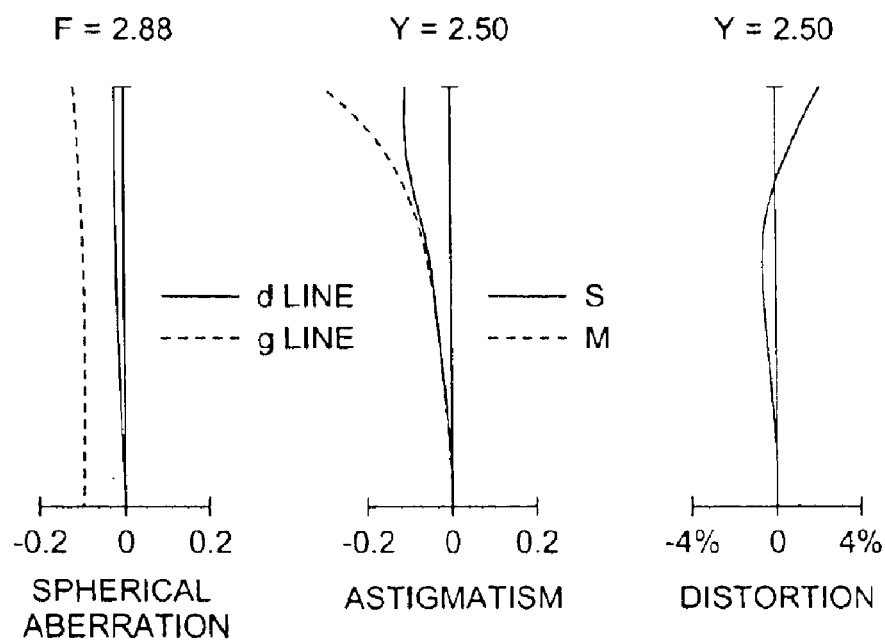

With respect to the optical system relating to Example 1, its lens data are shown in Table 1 and Table 2, a sectional view of the optical system in the case of photographing a subject at infinity is shown in FIG. 13(a), an aberration diagram in the aforementioned occasion is shown in FIG. 14(a), a sectional view of the optical system in the case of photographing (an absolute value of the radius of curvature of interface B of the refracting power-variable optical element QL has a minimum value) a subject at a subject distance of 5 cm is shown in FIG. 13(b), and an aberration diagram in the aforementioned occasion is shown in FIG. 14(b).

TABLE 1

(Example 1)
F = 2.88  2Y = 5.00 mm

| Surface No. | R (mm) | D (mm) | Nd | vd |
|---|---|---|---|---|
| 1 | ∞ | 0.20 | 1.51633 | 64.1 |
| 2 | ∞ | 0.40 | 1.33300 | 55.0 |
| 3 | Variable | 0.40 | 1.51510 | 41.5 |
| 4 | ∞ | 0.20 | 1.51633 | 64.1 |
| 5 | ∞ | 0.50 | | |
| 6 | 1.818 | 1.00 | 1.53180 | 56.0 |
| 7 | 3.713 | 0.25 | | |
| Aperture | ∞ | 0.62 | | |
| 8 | −1.687 | 1.22 | 1.53180 | 56.0 |
| 9 | −0.900 | 0.10 | | |
| 10 | 6.800 | 0.78 | 1.58300 | 30.0 |
| 11 | 1.534 | | | |

TABLE 1-continued (Example 1)
F = 2.88  2Y = 5.00 mm

Aspheric surface coefficient

| | |
|---|---|
| Sixth surface | K = 9.15720 × E−01 |
| | $A_4$ = −3.85700 × E−03 |
| | $A_6$ = 1.19250 × E−03 |
| | $A_8$ = 1.54340 × E−03 |
| | $A_{10}$ = −1.05850 × E−03 |
| Seventh surface | K = 1.90040 × E+01 |
| | $A_4$ = 1.42930 × E−03 |
| | $A_6$ = 6.64670 × E−02 |
| | $A_8$ = −1.05450 × E−01 |
| | $A_{10}$ = −2.10100 × E−02 |
| Eighth surface | K = −1.94220 × E−01 |
| | $A_4$ = −2.56700 × E−02 |
| | $A_6$ = −2.35200 × E−01 |
| | $A_8$ = 3.40250 × E−01 |
| | $A_{10}$ = −7.14810 × E−02 |
| Ninth surface | K = −2.82330 × E+00 |
| | $A_4$ = −2.17930 × E−01 |
| | $A_6$ = 1.31190 × E−01 |
| | $A_8$ = −8.59110 × E−02 |
| | $A_{10}$ = 2.63410 × E−02 |
| | $A_{12}$ = 6.50500 × E−04 |
| Tenth surface | K = −9.76570 × E+01 |
| | $A_4$ = −6.25440 × E−02 |
| | $A_6$ = 3.00290 × E−02 |
| | $A_8$ = −4.57290 × E−03 |
| | $A_{10}$ = −2.41900 × E−04 |
| | $A_{12}$ = 5.36600 × E−05 |
| Eleventh surface | K = −1.09320 × E+01 |
| | $A_4$ = −6.92620 × E−02 |
| | $A_6$ = 1.64970 × E−02 |
| | $A_8$ = −1.80070 × E−03 |
| | $A_{10}$ = −1.61900 × E−05 |
| | $A_{12}$ = 1.13470 × E−06 |

TABLE 2

| T (mm) | R3 (mm) | f' (mm) | f (mm) | f total (mm) | fB (mm) |
|---|---|---|---|---|---|
| ∞ | ∞ | ∞ | 3.812 | 3.812 | 1.646 |
| 50 | 9.170 | 50.357 | | 3.688 | |

Figure 15:
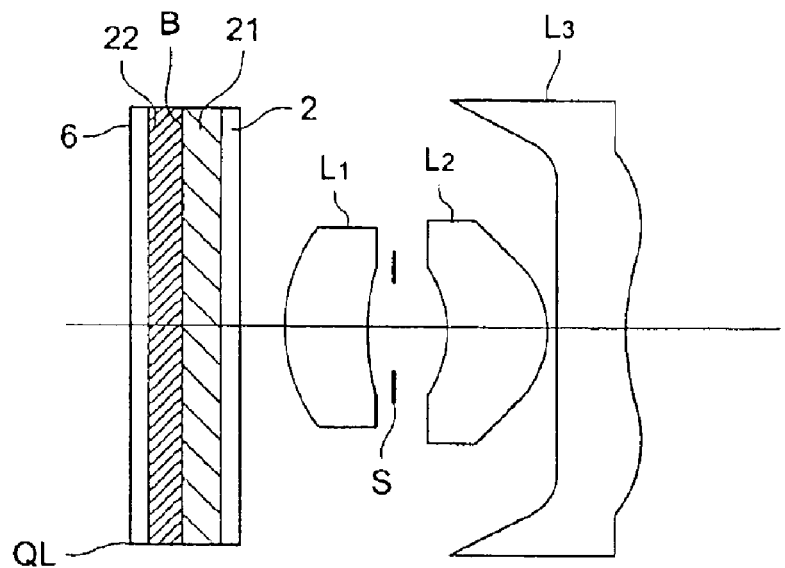
FIG. 15(a) and FIG. 15(b) are sectional views of an imaging lens of Comparative Example.
Figure 15:
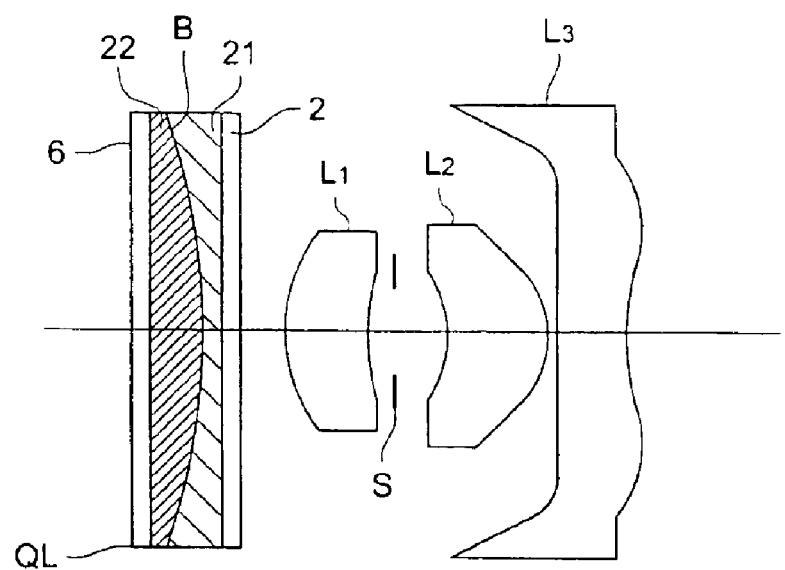
Figure 16:
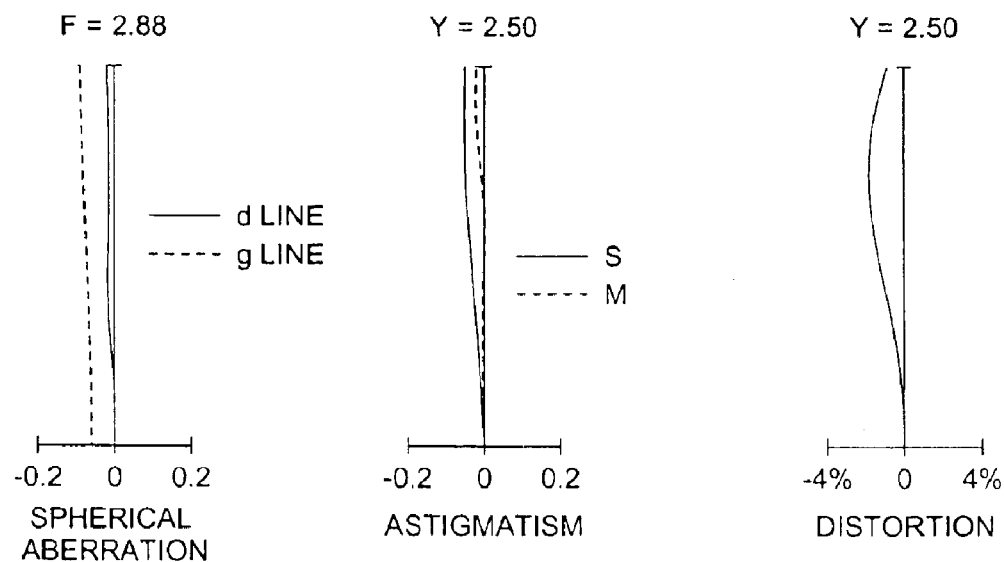
FIG. 16(a) and FIG. 16(b) are aberration diagrams of an imaging lens of Comparative Example.
Figure 16:
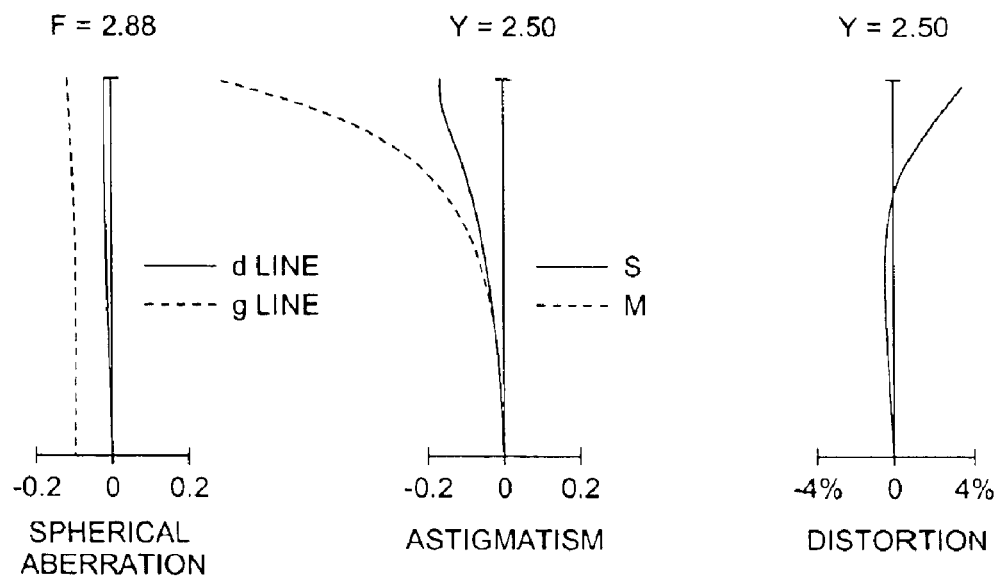

On the other hand, with respect to the optical system relating to Comparative Example, its lens data are shown in Table 3 and Table 4, a sectional view of the optical system in the case of photographing a subject at infinity is shown in FIG. 15(a), an aberration diagram in the aforementioned occasion is shown in FIG. 16(a), a sectional view of the optical system in the case of photographing (interface B of the refracting power-variable optical element QL has a minimum radius of curvature) a subject at a subject distance of 5 cm is shown in FIG. 15(b), and an aberration diagram in the aforementioned occasion is shown in FIG. 16(b).

TABLE 3

(Comparative Example)
F = 2.88  2Y = 5.00 mm

| Surface No. | R (mm) | D (mm) | Nd | νd |
|---|---|---|---|---|
| 1 | ∞ | 0.20 | 1.51633 | 64.1 |
| 2 | ∞ | 0.40 | 1.51510 | 41.5 |
| 3 | Variable | 0.40 | 1.33300 | 55.0 |
| 4 | ∞ | 0.20 | 1.51633 | 64.1 |
| 5 | ∞ | 0.50 | | |
| 6 | 1.818 | 1.00 | 1.53180 | 56.0 |
| 7 | 3.713 | 0.25 | | |
| Aperture | ∞ | 0.62 | | |
| 8 | −1.687 | 1.22 | 1.53180 | 56.0 |
| 9 | −0.900 | 0.10 | | |
| 10 | 6.800 | 0.78 | 1.58300 | 30.0 |
| 11 | 1.534 | | | |

Aspheric surface coefficient

| | |
|---|---|
| Sixth surface | K = 9.15720 × E−01 |
| | $A_4$ = −3.85700 × E−03 |
| | $A_6$ = 1.19250 × E−03 |
| | $A_8$ = 1.54340 × E−03 |
| | $A_{10}$ = −1.05850 × E−03 |
| Seventh surface | K = 1.90040 × E+01 |
| | $A_4$ = 1.42930 × E−03 |
| | $A_6$ = 6.64670 × E−02 |
| | $A_8$ = −1.05450 × E−01 |
| | $A_{10}$ = −2.10100 × E−02 |
| Eighth surface | K = −1.94220 × E−01 |
| | $A_4$ = −2.56700 × E−02 |
| | $A_6$ = −2.35200 × E−01 |
| | $A_8$ = 3.40250 × E−01 |
| | $A_{10}$ = −7.14810 × E−02 |
| Ninth surface | K = −2.82330 × E+00 |
| | $A_4$ = −2.17930 × E−01 |
| | $A_6$ = 1.31190 × E−01 |
| | $A_8$ = −8.59110 × E−02 |
| | $A_{10}$ = 2.63410 × E−02 |
| | $A_{12}$ = 6.50500 × E−04 |
| Tenth surface | K = −9.76570 × E+01 |
| | $A_4$ = −6.25440 × E−02 |
| | $A_6$ = 3.00290 × E−02 |
| | $A_8$ = −4.57290 × E−03 |
| | $A_{10}$ = −2.41900 × E−04 |
| | $A_{12}$ = 5.36600 × E−05 |
| Eleventh surface | K = −1.09320 × E+01 |
| | $A_4$ = −6.92620 × E−02 |
| | $A_6$ = 1.64970 × E−02 |
| | $A_8$ = −1.80070 × E−03 |
| | $A_{10}$ = −1.61900 × E−05 |
| | $A_{12}$ = 1.13470 × E−06 |

TABLE 4

| T (mm) | R3 (mm) | f' (mm) | f (mm) | f total (mm) | fB (mm) |
|---|---|---|---|---|---|
| ∞ | ∞ | ∞ | 3.812 | 3.812 | 1.646 |
| 50 | −9.170 | 50.357 | | 3.688 | |

A difference between Example 1 and Comparative Example is only the point that the refracting power-variable optical element QL was mounted in the direction opposite to the optical direction, and when photographing a subject at infinity, the interface is controlled to be perpendicular to the optical axis.

When comparing astigmatism diagrams between a group of FIG. 14(a) and FIG. 14(b) and a group of FIG. 16(a) and FIG. 16(b), it is understood that off-axis field curvature and astigmatism in Example 1 are lowered. Further, distortion is controlled to be small. When the direction from the vertex of the interface to the center of the radius of curvature agrees with the direction from the vertex of the interface to the aforementioned aperture stop in the case where an absolute value of the radius of curvature of fluid body interface B of the refracting power-variable optical element has a minimum value, as stated above, aberration of off-axis ray of light can be lowered.

Example 2

Figure 17:
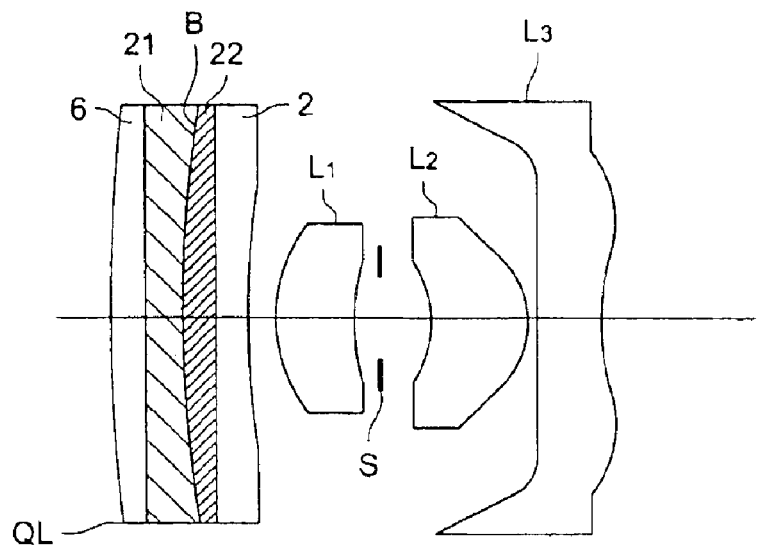
FIG. 17(a) and FIG. 17(b) are sectional views of an imaging lens of Example 2.
Figure 17:
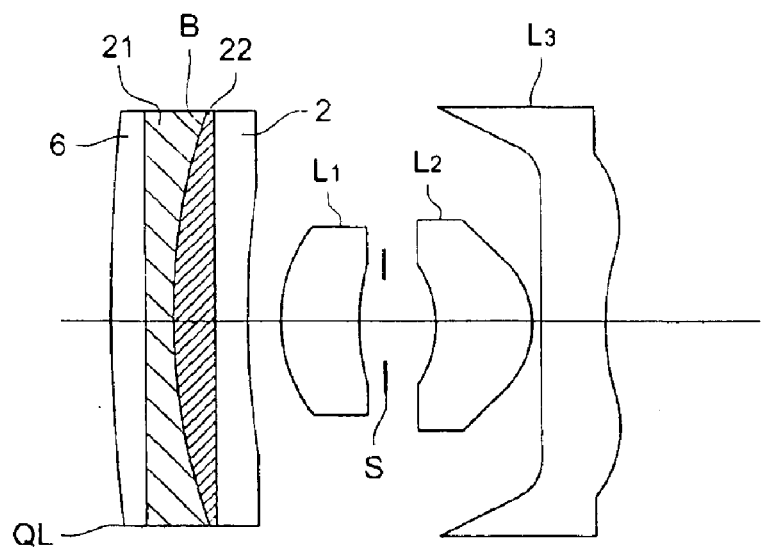
Figure 18:
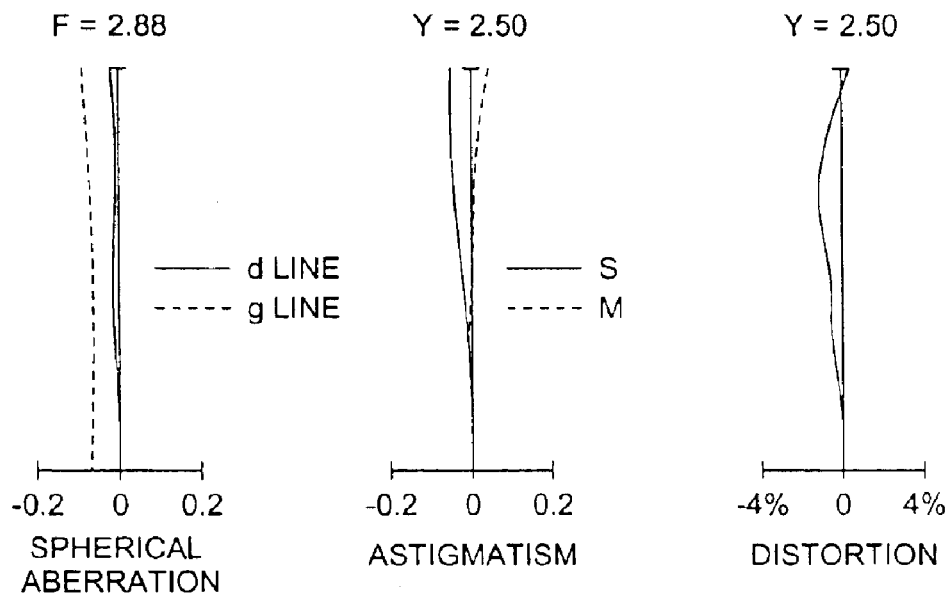
FIG. 18(a) and FIG. 18(b) are aberration diagrams of an imaging lens of Example 2.
Figure 18:
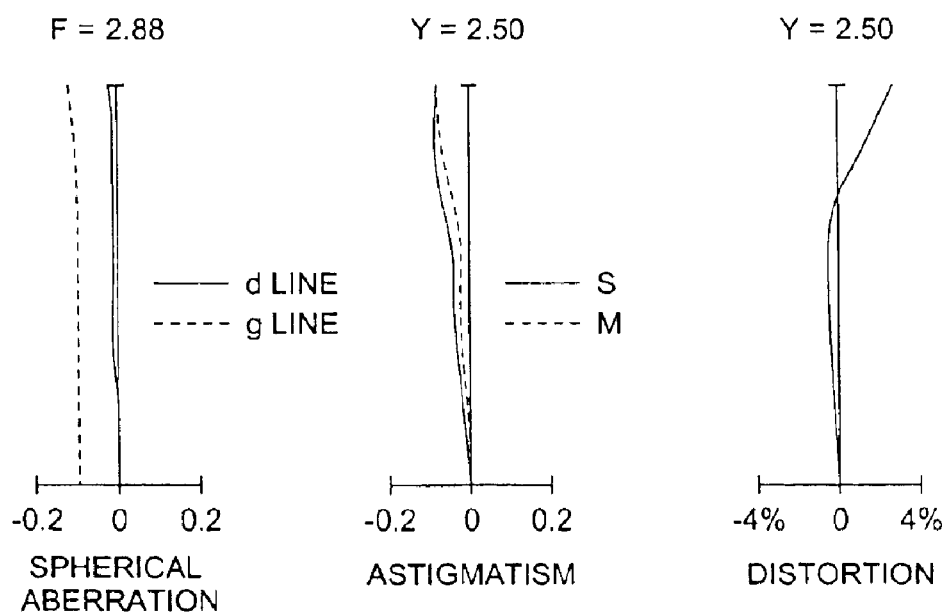

With respect to the optical system relating to Example 2, its lens data are shown in Table 5 and Table 6, a sectional view of the optical system in the case of photographing a subject at infinity is shown in FIG. 17(a), an aberration diagram in the aforementioned occasion is shown in FIG. 18(a), a sectional view of the optical system in the case of photographing (an absolute value of the radius of curvature of the interface B of the refracting power-variable optical element QL has a minimum value) a subject at a subject distance of 5 cm is shown in FIG. 17(b), and an aberration diagram in the aforementioned occasion is shown in FIG. 18(b). In Example 2, sealing plates 2 and 6 of the refracting power-variable optical element QL are made to have refracting power.

TABLE 5

(Example 2)
F = 2.88  2Y = 5.00 mm

| Surface No. | R (mm) | D (mm) | Nd | νd |
|---|---|---|---|---|
| 1 | 19.865 | 0.50 | 1.51633 | 64.1 |
| 2 | ∞ | 0.40 | 1.33300 | 55.0 |
| 3 | Variable | 0.40 | 1.51510 | 41.5 |
| 4 | ∞ | 0.40 | 1.51633 | 64.1 |
| 5 | 12.776 | 0.30 | | |
| 6 | 1.818 | 1.00 | 1.53180 | 56.0 |
| 7 | 3.713 | 0.25 | | |
| Aperture | ∞ | 0.62 | | |
| 8 | −1.687 | 1.22 | 1.53180 | 56.0 |
| 9 | −0.900 | 0.10 | | |
| 10 | 6.800 | 0.78 | 1.58300 | 30.0 |
| 11 | 1.534 | | | |

| Aspheric surface coefficient | |
|---|---|
| Sixth surface | K = 9.15720 × E−01 |
| | $A_4$ = −3.85700 × E−03 |
| | $A_6$ = 1.19250 × E−03 |
| | $A_8$ = 1.54340 × E−03 |
| | $A_{10}$ = −1.05850 × E−03 |
| Seventh surface | K = 1.90040 × E+01 |
| | $A_4$ = 1.42930 × E−03 |
| | $A_6$ = 6.64670 × E−02 |
| | $A_8$ = −1.05450 × E−01 |
| | $A_{10}$ = −2.10100 × E−02 |
| Eighth surface | K = −1.94220 × E−01 |
| | $A_4$ = −2.56700 × E−02 |
| | $A_6$ = −2.35200 × E−01 |
| | $A_8$ = 3.40250 × E−01 |
| | $A_{10}$ = −7.14810 × E−02 |
| Ninth surface | K = −2.82330 × E+00 |
| | $A_4$ = −2.17930 × E−01 |
| | $A_6$ = 1.31190 × E−01 |
| | $A_8$ = −8.59110 × E−02 |
| | $A_{10}$ = 2.63410 × E−02 |
| | $A_{12}$ = 6.50500 × E−04 |
| Tenth surface | K = −9.76570 × E+01 |
| | $A_4$ = −6.25440 × E−02 |
| | $A_6$ = 3.00290 × E−02 |
| | $A_8$ = −4.57290 × E−03 |
| | $A_{10}$ = −2.41900 × E−04 |
| | $A_{12}$ = 5.36600 × E−05 |
| Eleventh surface | K = −1.09320 × E+01 |
| | $A_4$ = −6.92620 × E−02 |
| | $A_6$ = 1.64970 × E−02 |
| | $A_8$ = −1.80070 × E−03 |
| | $A_{10}$ = −1.61900 × E−05 |
| | $A_{12}$ = 1.13470 × E−06 |

TABLE 6

| T (mm) | R3 (mm) | f′ (mm) | f (mm) | f total (mm) | fB (mm) |
|---|---|---|---|---|---|
| ∞ | 16.653 | −450.091 | 3.812 | 3.974 | 1.680 |
| 50 | 5.813 | 54.747 | | 3.829 | |

When comparing astigmatism diagrams between a group of FIG. 18(a) and FIG. 18(b) (Example 2) and a group of FIG. 14(a) and FIG. 14(b) (Comparative Example), it is understood that off-axis astigmatism in Example 2 is lowered. When the surface of sealing member (sealing plates 2 and 6) that seals the refracting power-variable optical element QL is formed to be a curved surface having the sign identical to that of the radius of curvature in the case where the absolute value of the radius of curvature of interface B that is variable corresponding to the subject distance is the minimum value, aberration of off-axis ray of light, in particular, can be lowered.

Example 3

Figure 19:
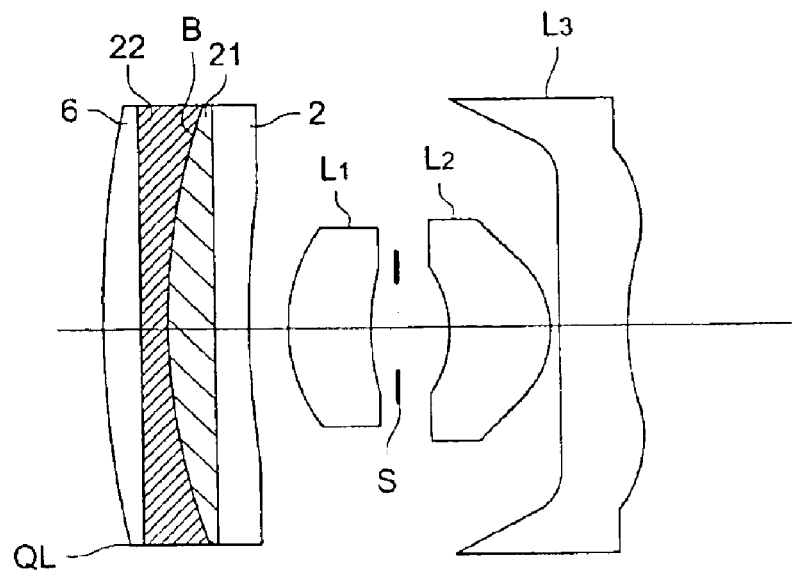
FIG. 19(a) and FIG. 19(b) are sectional views of an imaging lens of Example 3.
Figure 19:
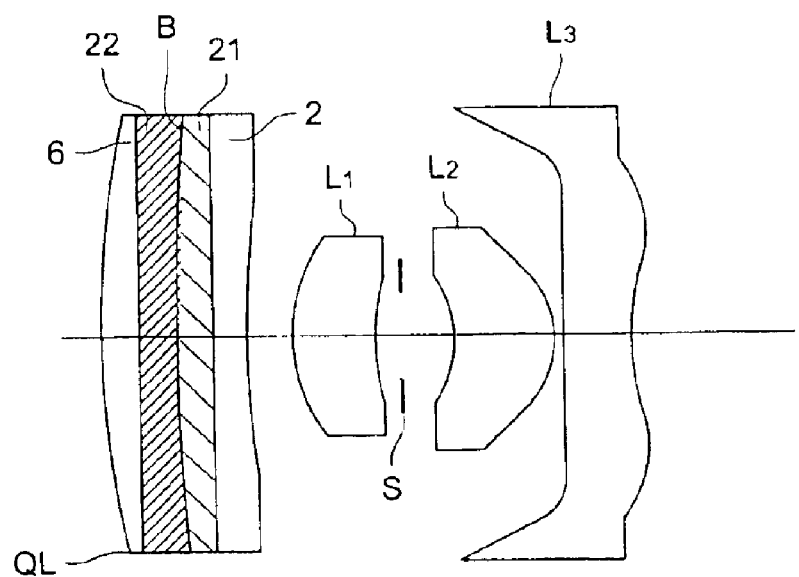
Figure 20:
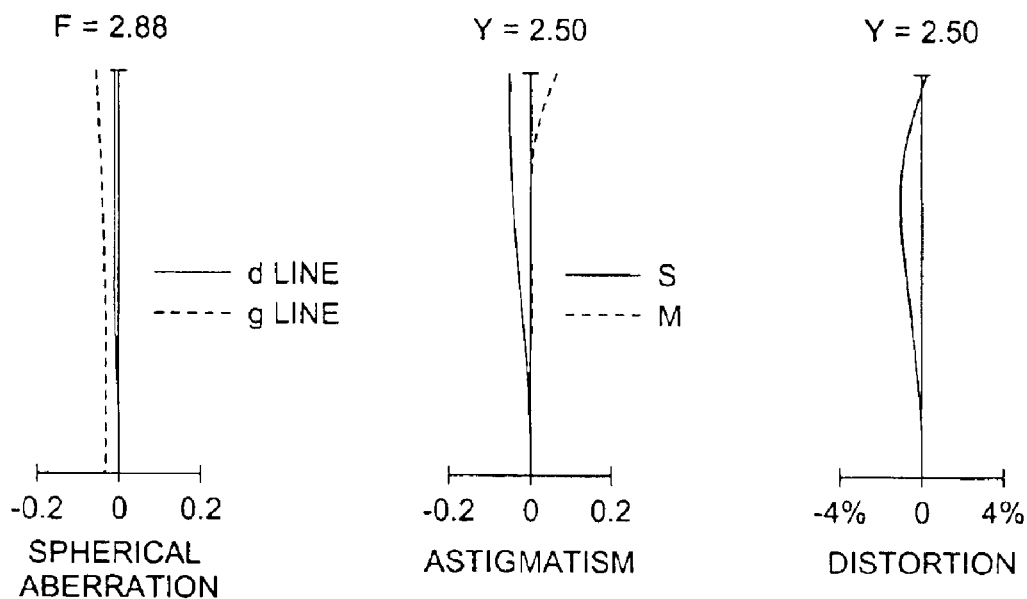
FIG. 20(a) and FIG. 20(b) are aberration diagrams of an imaging lens of Example 3.
Figure 20:
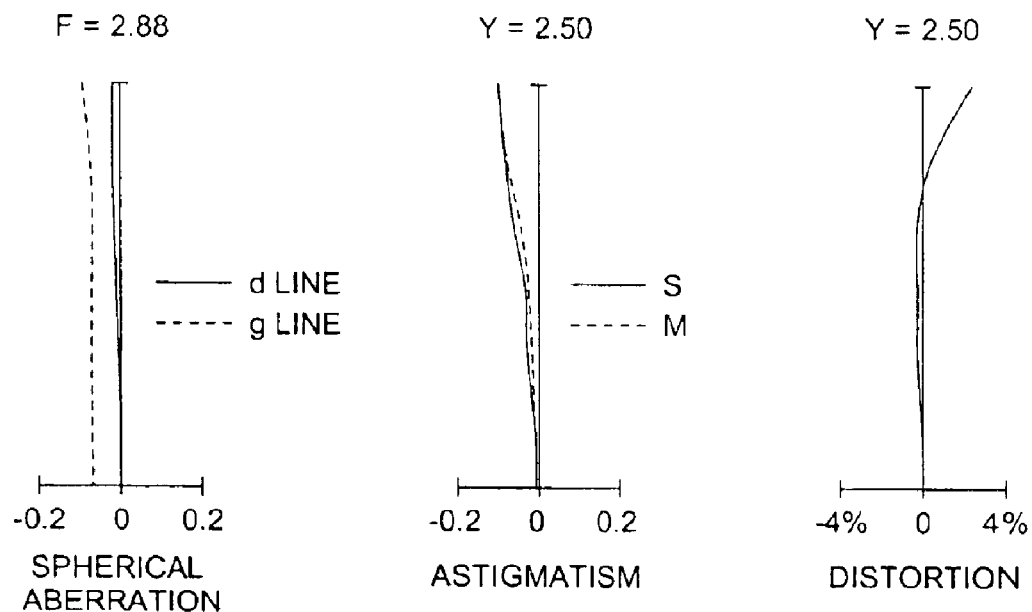

With respect to the optical system relating to Example 3, its lens data are shown in Table 7 and Table 8, a sectional view of the optical system in the case of photographing a subject at infinity (an absolute value of the radius of curvature of interface B of the refracting power-variable optical element QL has a minimum value) is shown in FIG. 19(a), an aberration diagram in the aforementioned occasion is shown in FIG. 20(a), a sectional view of the optical system in the case of photographing a subject at a subject distance of 5 cm is shown in FIG. 19(b), and an aberration diagram in the aforementioned occasion is shown in FIG. 20(b). Even in Example 3, sealing plates 2 and 6 of the refracting power-variable optical element QL are made to have refracting power.

TABLE 7

(Example 3)
F = 2.88  2Y = 5.00 mm

| Surface No. | R (mm) | D (mm) | Nd | νd |
|---|---|---|---|---|
| 1 | 10.403 | 0.50 | 1.51633 | 64.1 |
| 2 | ∞ | 0.40 | 1.51510 | 41.5 |
| 3 | 7.173 | 0.40 | 1.33300 | 55.0 |
| 4 | ∞ | 0.40 | 1.51633 | 64.1 |
| 5 | 16.310 | 0.30 | | |
| 6 | 1.818 | 1.00 | 1.53180 | 56.0 |
| 7 | 3.713 | 0.25 | | |
| Aperture | ∞ | 0.62 | | |
| 8 | −1.687 | 1.22 | 1.53180 | 56.0 |
| 9 | −0.900 | 0.10 | | |
| 10 | 6.800 | 0.78 | 1.58300 | 30.0 |
| 11 | 1.534 | | | |

| Aspheric surface coefficient | |
|---|---|
| First surface | K = 6.97017 × E−01 |
| | $A_4$ = −1.03035 × E−04 |
| | $A_6$ = 1.63059 × E−04 |
| | $A_8$ = −3.72850 × E−05 |
| | $A_{10}$ = 2.83449 × E−06 |
| Sixth surface | K = 9.15720 × E−01 |
| | $A_4$ = −3.85700 × E−03 |
| | $A_6$ = 1.19250 × E−03 |
| | $A_8$ = 1.54340 × E−03 |
| | $A_{10}$ = −1.05850 × E−03 |
| Seventh surface | K = 1.90040 × E+01 |
| | $A_4$ = 1.42930 × E−03 |

TABLE 7-continued (Example 3)
F = 2.88  2Y = 5.00 mm

| | |
|---|---|
| | $A_6 = 6.64670 \times E{-}02$ |
| | $A_8 = -1.05450 \times E{-}01$ |
| | $A_{10} = -2.10100 \times E{-}02$ |
| Eighth surface | $K = -1.94220 \times E{-}01$ |
| | $A_4 = -2.56700 \times E{-}02$ |
| | $A_6 = -2.35200 \times E{-}01$ |
| | $A_8 = 3.40250 \times E{-}01$ |
| | $A_{10} = -7.14810 \times E{-}02$ |
| Ninth surface | $K = -2.82330 \times E{+}00$ |
| | $A_4 = -2.17930 \times E{-}01$ |
| | $A_6 = 1.31190 \times E{-}01$ |
| | $A_8 = -8.59110 \times E{-}02$ |
| | $A_{10} = 2.63410 \times E{-}02$ |
| | $A_{12} = 6.50500 \times E{-}04$ |
| Tenth surface | $K = -9.76570 \times E{+}01$ |
| | $A_4 = -6.25440 \times E{-}02$ |
| | $A_6 = 3.00290 \times E{-}02$ |
| | $A_8 = -4.57290 \times E{-}03$ |
| | $A_{10} = -2.41900 \times E{-}04$ |
| | $A_{12} = 5.36600 \times E{-}05$ |
| Eleventh surface | $K = -1.09320 \times E{+}01$ |
| | $A_4 = -6.92620 \times E{-}02$ |
| | $A_6 = 1.64970 \times E{-}02$ |
| | $A_8 = -1.80070 \times E{-}03$ |
| | $A_{10} = -1.61900 \times E{-}05$ |
| | $A_{12} = 1.13470 \times E{-}06$ |

TABLE 8

| T (mm) | R3 (mm) | f' (mm) | f (mm) | f total (mm) | fB (mm) |
|---|---|---|---|---|---|
| ∞ | 7.173 | −189.32 | 3.812 | 4.036 | 1.728 |
| 50 | 41.305 | 64.761 | | 3.889 | |

When comparing astigmatism diagrams between a group of FIG. 20(a) and FIG. 20(b) (Example 3) and a group of FIG. 14(a) and FIG. 14(b) (Comparative Example), it is understood that off-axis astigmatism in Example 3 is lowered. When the surface of sealing member (sealing plates 2 and 6) that seals the refracting power-variable optical element QL is formed to be a curved surface having the sign identical to that of the radius of curvature in the case where the absolute value of the radius of curvature of interface B that is variable corresponding to the subject distance is the minimum value, aberration of off-axis ray of light, in particular, can be lowered.

Each of Examples 1–3 is an example wherein each of three lens L1–L3 which constitute a principal lens is made of plastic. Therefore, there is a possibility that a position of an image point of the total optical system is varied by changes in refractive index and thermal expansion of plastic materials when ambient temperatures are changed even if the subject distance is fixed. However, even in such a case, an image in focus can be obtained by adjusting refracting power of the refracting power-variable optical element.

Incidentally, though a curved surface of the sealing member is in a form of a spherical surface in Example 2, the same effect can also be obtained when the curved surface of the sealing member is in a form of an aspheric surface, and a boundary surface between a fluid body and the sealing member may be either a spherical surface or an aspheric surface. Further, if antireflection coating is provided on a boundary surface between sealing plates 2 and 6 and air, transmittance of the total optical system can be improved, which is preferable. Further, if at least one of sealing members is made of material having infrared absorption characteristics, it is not necessary to provide an infrared blocking filter separately, which is preferable.

Figure 21:
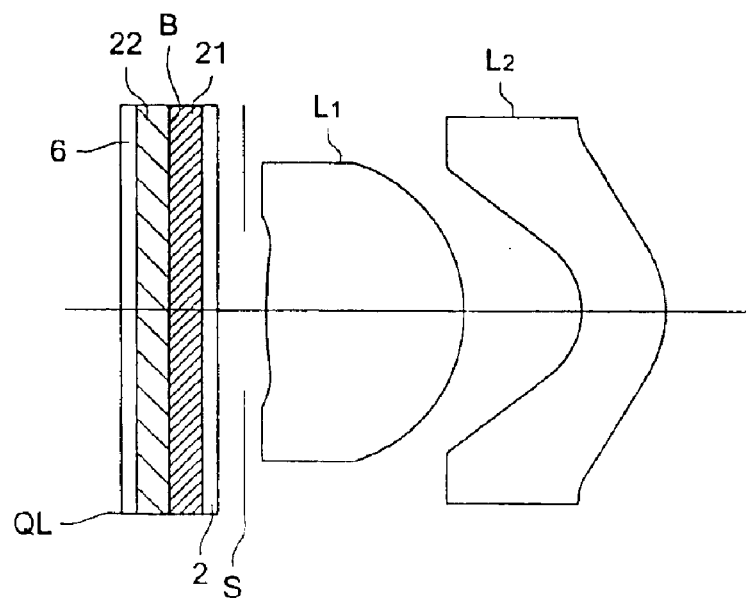
FIG. 21(a) and FIG. 21(b) are sectional views of another optical system of the present embodiment.
Figure 21:
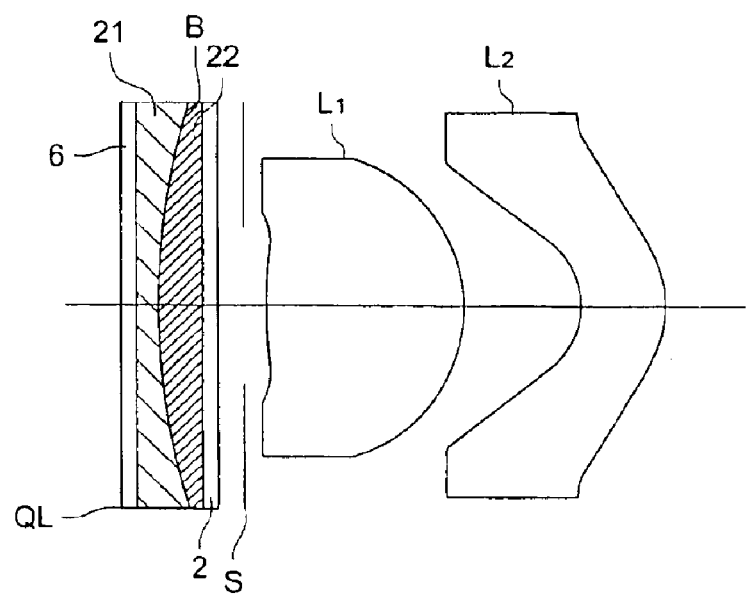

Moreover, an optical system shown in FIGS. 21(a) and 21(b) is proposed for another embodiment of the present invention. In this embodiment, it is characterized by that optical aperture and the refractive action variable optical element QL adjoin. FIG. 21(a) represents a state of an optical system when object distance is far infinitely and FIG. 22(b) represents a state of an optical system when object distance is short. A number the same as the figures names the same member and their instructions are omitted here. As thus described, by positioning optical aperture at a position in proximity to refractive action variable optical element QL, an outer diameter of the refractive action variableness optical element QL gets possible to be made small and to be produced easily.

The invention has been explained above referring to the embodiments, to which, however, the invention is not limited, and modification and improvement can naturally be made according to circumstances. Though it is preferable that the image pickup apparatus of the invention is housed in a personal digital assistance such as a small digital still camera, a cell phone and PDA, the image pickup apparatus of the invention can also be used for other uses such as a personal computer camera.

An image pickup apparatus which is small, is used for multiple use, and is available for various correction and adjustment by combining an image the optical element which its refractive action is switched electrically, and is possible as above.

According to the present invention, there can be provided an optical system and an image pickup apparatus in which various aberrations are excellently corrected while comprising variable focus lens with the use of an electric capillary phenomenon as autofocus means.

What is claimed is:

1. An image pickup apparatus comprising:
   a substrate;
   an image pickup element on the substrate to convert a converged light flux to electronic signals;
   an image-taking optical element positioned so as to converge a light flux from an object onto the image pickup element;
   a light shielding member to house the image pickup element and the image-taking optical element;
   a controlling device to control an output of the electronic signals and controlling the image pickup element; and
   a refracting power-variable optical element,
   wherein the refracting power-variable optical element comprises:
      a first fluid member having a first refractive index and having an electrical conductivity;
      a second fluid member having a second refractive index, which is different from the first refractive index, and having an insulative property, the second fluid member having no affinity for the first fluid member and having a same density as the first fluid member;
      a shell member, in which the first fluid member and the second fluid member are filled and sealed, the shell member being made of an insulative material and having a opening portion to pass a light flux so that the light flux passed through the first fluid member and the second fluid member;

a first electrode contacting the first fluid member;
a second electrode installed at the shell member; and
an electric voltage-supplying device to change a shape of the second fluid member in the shell member by changing a wetting property of the shell member for the second fluid member by supplying an electric voltage between the first fluid member and the shell member.

2. The image pickup apparatus of claim 1, wherein the refracting power-variable optical element further comprises a sealing member to seal the opening portion of the shell member, and the sealing member has a light transmittance and has an aspherical optical surface on at least one surface of he sealing member.

3. The image pickup apparatus of claim 2, wherein the aspherical optical surface is capable of correcting an aberration, which is generated when the light flux is passed through the first fluid member and the second fluid member.

4. The image pickup apparatus of claim 1, wherein the refracting power-variable optical element is positioned at an object side of the image-taking optical element.

5. The image pickup apparatus of claim 4, wherein the image-taking optical element includes an optical element, which is the closest to the object, and the optical element is the sealing member.

6. The image pickup apparatus of claim 1, wherein the refracting power-variable optical element further comprises an IR cutting filter to cut an infrared light and to seal the opening portion of the shell member.

7. The image pickup apparatus of claim 1, wherein the refracting power-variable optical element further comprises:
   a memory to store a relation between a value of the electric voltage supplied by the electric voltage-supplying device and a shape of the second fluid member in response to the value of the electric voltage; and
   an electric voltage controlling device to control the electric voltage supplied by the electric voltage-supplying device according to the relation stored in the memory.

8. The image pickup apparatus of claim 1, wherein the refracting power-variable optical element conducts an adjustment of a focus length with the electric voltage supplied by the electric voltage-supplying device.

9. The image pickup apparatus of claim 1, wherein the refracting power-variable optical element conducts a focus adjustment with the electric voltage supplied by the electric voltage-supplying device.

10. The image pickup apparatus of claim 1, wherein the refracting power-variable optical element shifts an optical axis of the refracting power-variable optical element to conform to an optical axis of the image-taking optical element with the electric voltage supplied by the electric voltage-supplying device.

11. The image pickup apparatus of claim 1, wherein the refracting power-variable optical element tilts an optical axis of the refracting power-variable optical element to conform to an optical axis of the image-taking optical element with the electric voltage supplied by the electric voltage-supplying device.

12. An optical system comprising:
   an optical aperture to confine an amount of a light flux passed through the optical aperture; and
   a refractive power-variable optical element comprising:
      a first fluid member having a first refractive index and having an electrical conductivity;
      a second fluid member having a second refractive index, which is different from the first refractive index, and having an insulative property, the second fluid member having substantially no affinity for the first fluid member and having a substantially same density as the first fluid member;
      a shell member, in which the first fluid member and the second fluid member are filled and sealed, at least a part of the shell member being made of an insulative material so that a light flux passes through the first fluid member and the second fluid member;
      a first electrode contacting the first fluid member;
      a second electrode installed at the shell member; and
      an electric voltage-supplying device to change a shape of an interface between the first fluid member and the second fluid member by supplying an electric voltage between the first fluid member and the shell member,
   wherein when a curvature radius of the interface between the first fluid member and the second fluid member has the minimum absolute value, a direction from a top of the interface to a center of curvature radius of the interface conforms to a direction from the top of the interface to the optical aperture.

13. The optical system of claim 12, wherein the shell member has at least a curved surface, and a curvature radius of the curved surface of the shell member and a curvature radius of the interface between the first fluid member and the second fluid member have the same sign, when the curvature radius of the interface between the first fluid member and the second fluid member has the minimum absolute value.

14. The optical system of claim 12, further comprising an optical element, which is adjacent to or contacts the refractive power-variable optical element,
   wherein the shell member is a parallel plane plate, and a curvature radius of at least an optical surface of the optical element and a curvature radius of the interface between the first fluid member and the second fluid member have the same sign, when the curvature radius of the interface between the first fluid member and the second fluid member has the minimum absolute value.

15. The optical system of claim 13, wherein a refractive power of the curved surface of the shell member and a refractive power of the interface between the first fluid member and the second fluid member have a different sign from each other, when the curvature radius of the interface between the first fluid member and the second fluid member has the minimum absolute value.

16. The optical system of claim 14, wherein a refractive power of the optical surface of the optical element and a refractive power of the interface between the first fluid member and the second fluid member have a different sign from each other, when the curvature radius of the interface between the first fluid member and the second fluid member has the minimum absolute value.

17. The optical system of claim 12, wherein each curvature radius of two surfaces of the shell member, where the light flux passes through and are boundary surfaces to outer air, and the curvature radius of the interface between the first fluid member and the second fluid member have the same sign, when the curvature radius of the interface between the first fluid member and the second fluid member has the minimum absolute value.

18. The optical system of claim 12, wherein the following relations are satisfied:

when $ni>no$, $|Rf|>|Rn|$ when $ni<no$, $|Rf|<|Rn|$ where ni represents a refractive index of a fluid member nearer to the optical aperture among the first fluid member and the second fluid member; no represents a refractive index of a fluid member farther from the optical aperture among the first fluid member and the second fluid member; |Rf| represents an absolute value of a curvature radius of the interface between the first fluid member and the second fluid member when an object, which is positioned at first position, is to be focused by the optical system; and |Rn| represents an absolute value of a curvature radius of the interface between the first fluid member and the second fluid member when an object, which is positioned at second position being nearer than the first position from the optical system, is to be focused by the optical system.

19. The optical system of claim 12, further comprising a main lens, which is positioned at a position farther from an object than the refractive power-variable optical element.

20. The optical system of claim 19, wherein the optical aperture is positioned at a position adjacent to the refractive power-variable optical element and the main lens.

21. The optical system of claim 19, wherein the following relation is satisfied:

$$|f'|/f > 5$$

wherein |f'| is an absolute value of a focus length of the refractive power-variable optical element when the absolute value becomes maximum in a range of object distance, which the optical system can focus; and f represents a focus length of the main lens.

22. The optical system of claim 12, wherein the shell member is capable of cutting an infrared light.

23. An image pickup apparatus comprises:

the optical system of claim 12; and an image pickup element to convert a light flux converged by the optical system to electronic signals.

* * * * *